(12) United States Patent
Manolakos et al.

(10) Patent No.: US 11,108,613 B2
(45) Date of Patent: Aug. 31, 2021

(54) PHASE TRACKING REFERENCE SIGNAL PORT OR CONFIGURATION SHARING ACROSS MULTIPLE PHYSICAL DOWNLINK CHANNELS OF MULTIPLE TRANSMIT RECEIVE POINTS

(71) Applicant: QUALCOMM Incorporated, San Diego, CA (US)

(72) Inventors: Alexandros Manolakos, San Diego, CA (US); Heechoon Lee, San Diego, CA (US); Makesh Pravin John Wilson, San Diego, CA (US); Wanshi Chen, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 219 days.

(21) Appl. No.: 16/526,804

(22) Filed: Jul. 30, 2019

(65) Prior Publication Data

US 2020/0052950 A1 Feb. 13, 2020

(30) Foreign Application Priority Data

Aug. 8, 2018 (GR) .............................. 20180100375

(51) Int. Cl.
*H04L 27/26* (2006.01)
*H04L 5/00* (2006.01)
(Continued)

(52) U.S. Cl.
CPC .......... *H04L 27/2657* (2013.01); *H04L 5/001* (2013.01); *H04L 5/0048* (2013.01);
(Continued)

(58) Field of Classification Search
None
See application file for complete search history.

(56) References Cited

U.S. PATENT DOCUMENTS

2018/0041321 A1* 2/2018 Guo .................. H04L 5/0048
2019/0052433 A1* 2/2019 Yoo .................. H04W 76/27
(Continued)

FOREIGN PATENT DOCUMENTS

| CN | 107888266 A | 4/2018 |
| EP | 3512243 A1 | 7/2019 |

OTHER PUBLICATIONS

International Search Report and Written Opinion—PCT/US2019/044341—ISA/EPO—dated Jan. 17, 2020.
(Continued)

*Primary Examiner* — Hassan Kizou
*Assistant Examiner* — Hector Reyes
(74) *Attorney, Agent, or Firm* — Harrity & Harrity, LLP

(57) ABSTRACT

Various aspects of the present disclosure generally relate to wireless communication. In some aspects, a user equipment (UE) may determine that a phase tracking reference signal (PTRS) port is to be shared among a plurality of physical downlink shared channels (PDSCHs) transmitted by a plurality of transmit receive points (TRPs); receive PTRS pilot signals on one or more PDSCHs of the plurality of PDSCHs; and use the PTRS pilot signals for phase tracking estimation for the plurality of PDSCHs based at least in part on the determination that the PTRS port is to be shared among the plurality of PDSCHs. Numerous other aspects are provided.

30 Claims, 12 Drawing Sheets

(51) Int. Cl.
*H04W 72/04* (2009.01)
*H04W 76/27* (2018.01)

(52) U.S. Cl.
CPC ....... *H04L 27/2613* (2013.01); *H04W 72/042* (2013.01); *H04W 76/27* (2018.02)

(56) References Cited

U.S. PATENT DOCUMENTS

| | | | |
|---|---|---|---|
| 2019/0238247 A1* | 8/2019 | Lee | H04L 27/38 |
| 2019/0296877 A1* | 9/2019 | Zhang | H04W 72/042 |
| 2020/0022172 A1* | 1/2020 | Sun | H04L 25/03821 |
| 2020/0083996 A1* | 3/2020 | Hunukumbure | H04L 5/0035 |

OTHER PUBLICATIONS

Mediatek Inc: "Multi-TRP and Multi-Panel Transmission", 3GPP TSG RAN WG1 Meeting #88bis, 3GPP Draft; R1-1707837 Multi-TRP Final, 3rd Generation Partnership Project (3GPP), Mobile Competence Centre, 650, Route Des Lucioles ; F-06921 Sophia-Antipolis Cedex, France, vol. RAN WG1, No. Hangzhou, China; May 15, 2017-May 19, 2017, May 14, 2017 (May 14, 2017), pp. 1-4, XP051213038, Retrieved from the Internet: URL: http://www.3gpp.org/ftp/Meetings_3GPP_SYNC/RAN1/Docs/ [retrieved on May 14, 2017], Section 2, p. 1 line 22-line 38, p. 2, line 21-line 28, p. 3, line 11-line 39.

ZTE, et al., "Remaining Details on PT-RS", 3GPP TSG RAN WG1 Meeting NR#3, 3GPP Draft; R1-1715450 Remaining Details on PT-RS, 3rd Generation Partnership Proiect (3GPP), Mobile Competence Centre; 650, Route Des Lucioles; F-06921 Sophia-Antipolis Cedex; France, vol. RAN WG1, No. Nagoya, Japan; Sep. 18, 2017-Sep. 21, 2017, Sep. 17, 2017 (Sep. 17, 2017), pp. 1-7, XP051338918, Retrieved from the Internet: URL: http://www.3gpp.org/ftp/Meetings_3GPP_SYNC/RAN1/Docs/ [retrieved on Sep. 17, 2017] p. 2, line 3-line 40.

Nokia, et al., "On the PTRS design for NR", 3GPP TSG RAN WG1 NR Ad-Hoc Meeting, 3GPP Draft; R1-1701105, 3rd Generation Partnership Project (3GPP), Mobile Competence Centre; 650, Route Des Lucioles; F-06921 Sophia-Antipolis Cedex; France, vol. RAN WG1, No. Spokane, USA; Jan. 16, 2017-Jan. 20, 2017, Jan. 16, 2017 (Jan. 16, 2017), 16 Pages, XP051208619, Retrieved from the Internet: URL: http://www.3gpp.org/ftp/Meetings_3GPP_SYNC/RAN1/Docs/ [retrieved on Jan. 16, 2017] section 2.1; figure 1, section 2.2; figure 2, section 3.1, section 3.2, sections 3.3.

Partial International Search Report—PCT/US2019/044341—ISA/EPO—dated Oct. 16, 2019.

ZTE: "Discussion on RS for Phase Tracking", 3GPP TSG RAN WG1 Meeting #90, 3GPP Draft; R1-1712308 Discussion on RS for Phase Tracking, 3rd Generation Partnership Project (3GPP), Mobile Competence Centre; 650, Route Des Lucioles; F-06921 Sophia-Antipolis Cedex; France, vol. RAN WG1, No. Prague, Czechia; Aug. 21, 2017-Aug. 25, 2017, Aug. 20, 2017 (Aug. 20, 2017), 7 Pages, XP051315124, Retrieved from the Internet: URL: http://www.3gpp.org/ftp/Meetings_3GPP_SYNC/RAN1/Docs/ [retrieved on Aug. 20, 2017] p. 2, line 5-p. 3, line 1.

* cited by examiner

PHASE TRACKING REFERENCE SIGNAL PORT OR CONFIGURATION SHARING ACROSS MULTIPLE PHYSICAL DOWNLINK CHANNELS OF MULTIPLE TRANSMIT RECEIVE POINTS

CROSS-REFERENCE TO RELATED APPLICATIONS

This application claims priority to Greece Patent Application No. 20180100375, filed on Aug. 8, 2018, entitled "PHASE TRACKING REFERENCE SIGNAL PORT OR CONFIGURATION SHARING ACROSS MULTIPLE PHYSICAL DOWNLINK CHANNELS OF MULTIPLE TRANSMIT RECEIVE POINTS," which is hereby expressly incorporated by reference herein.

FIELD OF THE DISCLOSURE

Aspects of the present disclosure generally relate to wireless communication and to techniques and apparatuses for phase tracking reference signal (PTRS) port or configuration sharing across multiple physical downlink channels of multiple transmit receive points (TRPs).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include determining that a phase tracking reference signal (PTRS) port is to be shared among a plurality of physical downlink shared channels (PDSCHs) transmitted by a plurality of transmit receive points (TRPs); receiving PTRS pilot signals on one or more PDSCHs of the plurality of PDSCHs; and using the PTRS pilot signals for phase tracking estimation for the plurality of PDSCHs based at least in part on the determination that the PTRS port is to be shared among the plurality of PDSCHs.

In some aspects, a UE for wireless communication may include memory and one or more processors operatively coupled to the memory. The memory and the one or more processors may be configured to determine that a PTRS port is to be shared among a plurality of PDSCHs transmitted by a plurality of TRPs; receive PTRS pilot signals on one or more PDSCHs of the plurality of PDSCHs; and use the PTRS pilot signals for phase tracking estimation for the plurality of PDSCHs based at least in part on the determination that the PTRS port is to be shared among the plurality of PDSCHs.

In some aspects, a non-transitory computer-readable medium may store one or more instructions for wireless communication. The one or more instructions, when executed by one or more processors of a UE, may cause the one or more processors to determine that a PTRS port is to be shared among a plurality of PDSCHs transmitted by a plurality of TRPs; receive PTRS pilot signals on one or more PDSCHs of the plurality of PDSCHs; and use the PTRS pilot signals for phase tracking estimation for the plurality of PDSCHs based at least in part on the determination that the PTRS port is to be shared among the plurality of PDSCHs.

In some aspects, an apparatus for wireless communication may include means for determining that a PTRS port is to be shared among a plurality of PDSCHs transmitted by a plurality of TRPs; means for receiving PTRS pilot signals on one or more PDSCHs of the plurality of PDSCHs; and means for using the PTRS pilot signals for phase tracking estimation for the plurality of PDSCHs based at least in part on the determination that the PTRS port is to be shared among the plurality of PDSCHs.

In some aspects, a method of wireless communication, performed by a UE, may include determining that the UE is to communicate with multiple TRPs using a specific multi-TRP mode, wherein the specific multi-TRP mode indicates a number of downlink control information (DCI) communications to be used for scheduling and a number of PDSCHs to be scheduled by the number of DCI communications, wherein the number of PDSCHs are transmitted by the multiple TRPs; determining whether to use a shared PTRS configuration across the number of PDSCHs or separate PTRS configurations for the number of PDSCHs based at least in part on the specific multi TRP mode; and selectively using the shared PTRS configuration or the separate PTRS configurations for phase tracking estimation on the number of PDSCHs based at least in part on the determination of whether to use the shared PTRS configuration or the separate PTRS configurations.

In some aspects, a UE for wireless communication may include memory and one or more processors operatively coupled to the memory. The memory and the one or more processors may be configured to determine that the UE is to communicate with multiple TRPs using a specific multi-TRP mode, wherein the specific multi-TRP mode indicates a number of DCI communications to be used for scheduling and a number of PDSCHs to be scheduled by the number of DCI communications, wherein the number of PDSCHs are transmitted by the multiple TRPs; determine whether to use a shared PTRS configuration across the number of PDSCHs or separate PTRS configurations for the number of PDSCHs based at least in part on the specific multi TRP mode; and selectively use the shared PTRS configuration or the separate PTRS configurations for phase tracking estimation on the number of PDSCHs based at least in part on the determination of whether to use the shared PTRS configuration or the separate PTRS configurations.

In some aspects, a non-transitory computer-readable medium may store one or more instructions for wireless communication. The one or more instructions, when executed by one or more processors of a UE, may cause the one or more processors to determine that the UE is to communicate with multiple TRPs using a specific multi-TRP mode, wherein the specific multi-TRP mode indicates a number of DCI communications to be used for scheduling and a number of PDSCHs to be scheduled by the number of DCI communications, wherein the number of PDSCHs are transmitted by the multiple TRPs; determine whether to use a shared PTRS configuration across the number of PDSCHs or separate PTRS configurations for the number of PDSCHs based at least in part on the specific multi TRP mode; and selectively use the shared PTRS configuration or the separate PTRS configurations for phase tracking estimation on the number of PDSCHs based at least in part on the determination of whether to use the shared PTRS configuration or the separate PTRS configurations.

In some aspects, an apparatus for wireless communication may include means for determining that the apparatus is to communicate with multiple TRPs using a specific multi-TRP mode, wherein the specific multi-TRP mode indicates a number of DCI communications to be used for scheduling and a number of PDSCHs to be scheduled by the number of DCI communications, wherein the number of PDSCHs are transmitted by the multiple TRPs; means for determining whether to use a shared PTRS configuration across the number of PDSCHs or separate PTRS configurations for the number of PDSCHs based at least in part on the specific multi TRP mode; and means for selectively using the shared PTRS configuration or the separate PTRS configurations for phase tracking estimation on the number of PDSCHs based at least in part on the determination of whether to use the shared PTRS configuration or the separate PTRS configurations.

Aspects generally include a method, apparatus, system, computer program product, non-transitory computer-readable medium, user equipment, base station, wireless communication device, TRP, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
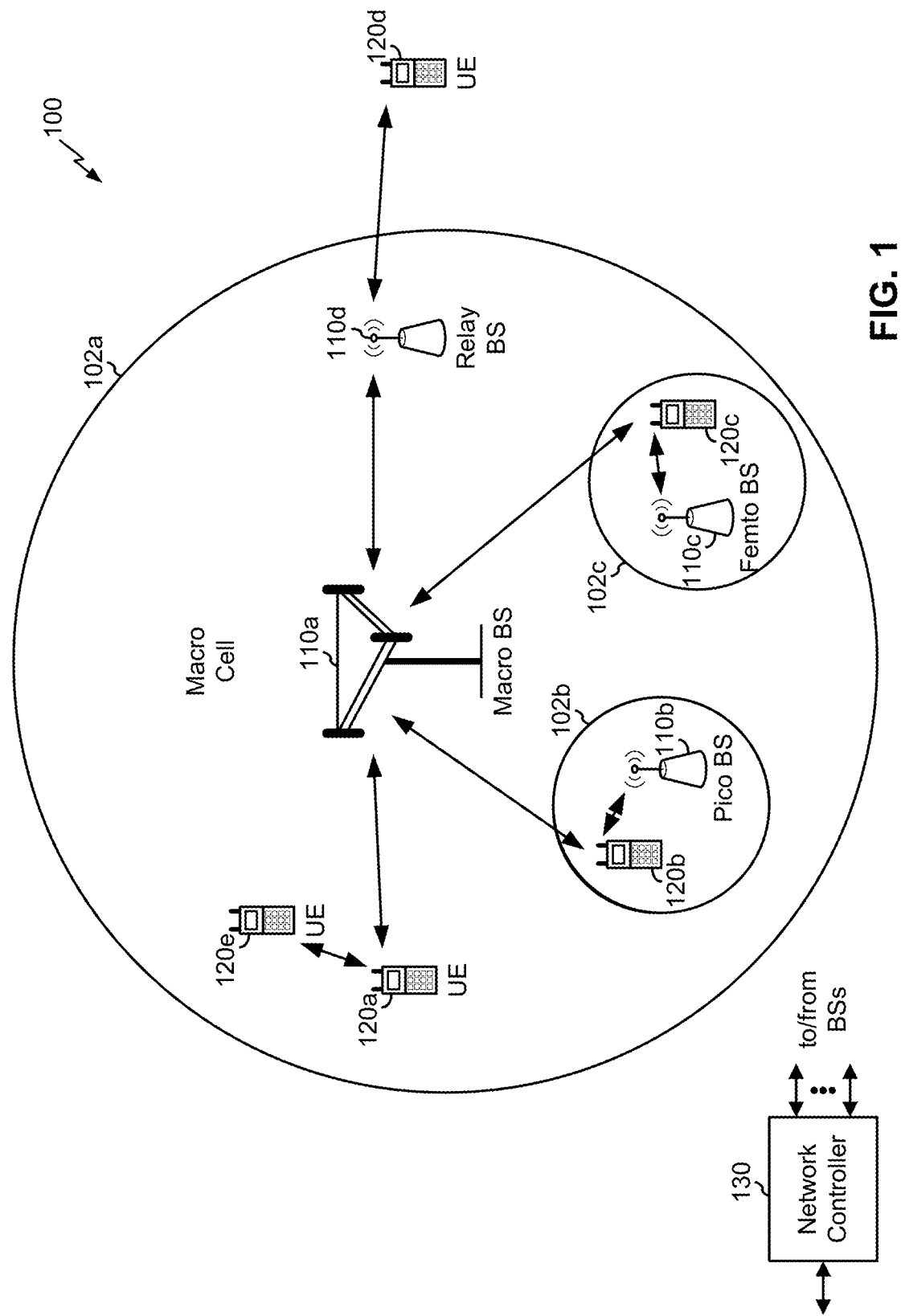
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
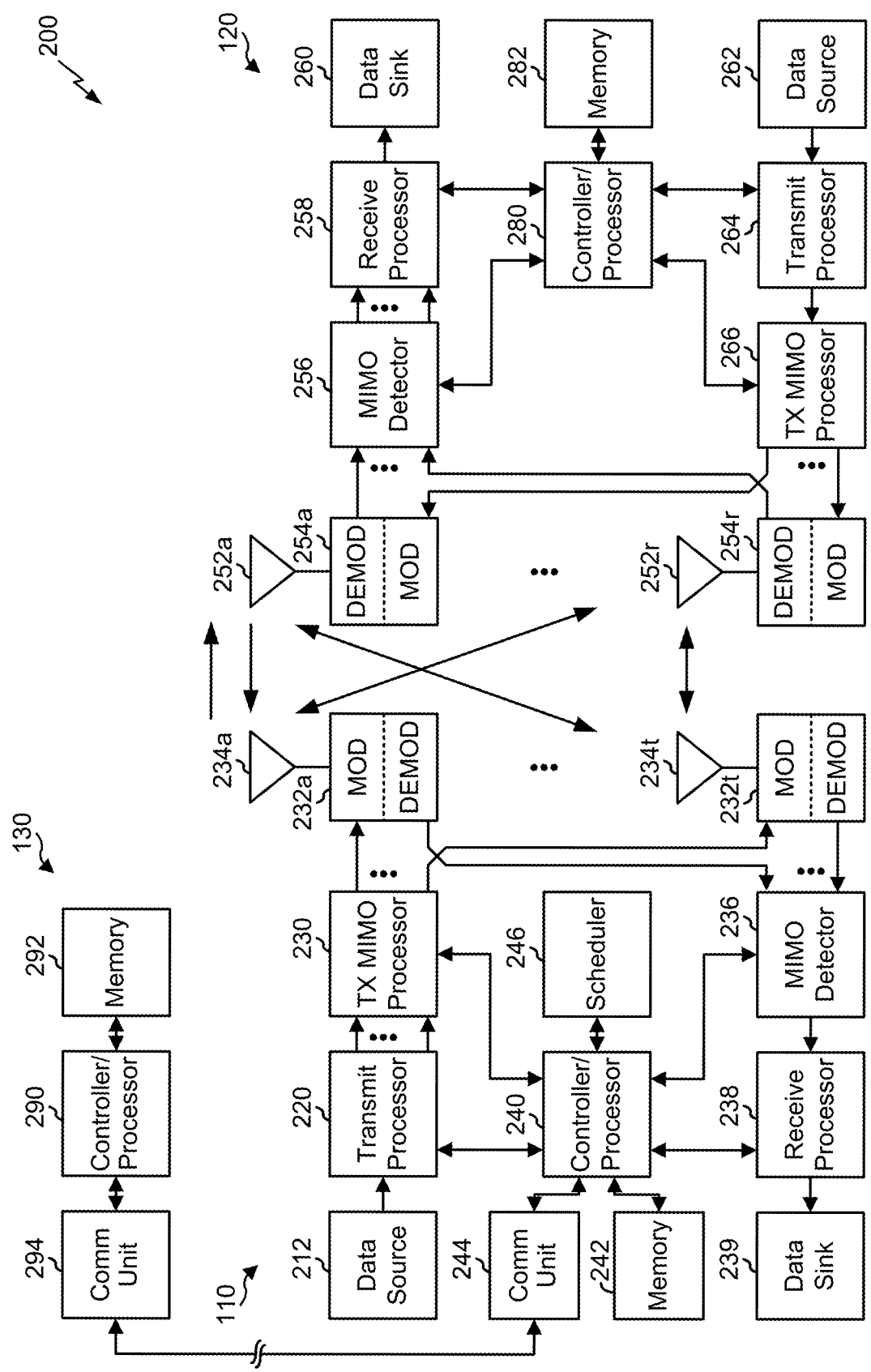
FIG. 2 is a block diagram conceptually illustrating an example of a base station in communication with a user equipment in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with phase tracking reference signal (PTRS) port or configuration sharing across multiple physical downlink channels of multiple transmit receive points (TRPs), as described in more detail elsewhere herein. For example, controller/processor 240 of base station 110, controller/processor 280 of UE 120, and/or any other component(s) of FIG. 2 may perform or direct operations of, for example, process 1100 of FIG. 11, process 1200 of FIG. 12, and/or other processes as described herein. Memories 242 and 282 may store data and program codes for base station 110 and UE 120, respectively. A scheduler 246 may schedule UEs for data transmission on the downlink and/or uplink.

In some aspects, the UE 120 may include means for determining that a PTRS port is to be shared among a plurality of physical downlink shared channels (PDSCHs) transmitted by a plurality of TRPs; means for receiving PTRS pilot signals on one or more PDSCHs of the plurality of PDSCHs; means for using the PTRS pilot signals for phase tracking estimation for the plurality of PDSCHs based at least in part on the determination that the PTRS port is to be shared among the plurality of PDSCHs; and/or the like. Additionally, or alternatively, the UE 120 may include means for determining that the UE 120 is to communicate with multiple TRPs using a specific multi-TRP mode, wherein the specific multi-TRP mode indicates a number of downlink control information (DCI) communications to be used for scheduling and a number of PDSCHs to be scheduled by the number of DCI communications, wherein the number of PDSCHs are transmitted by the multiple TRPs; means for determining whether to use a shared PTRS configuration across the number of PDSCHs or separate PTRS configurations for the number of PDSCHs based at least in part on the specific multi TRP mode; means for selectively using the shared PTRS configuration or the separate PTRS configurations for phase tracking estimation on the number of PDSCHs based at least in part on the determination of whether to use the shared PTRS configuration or the separate PTRS configurations; and/or the like. In some aspects, such means may include one or more components of UE 120 described in connection with FIG. 2.

As indicated above, FIG. 2 is provided merely as an example. Other examples may differ from what is described with regard to FIG. 2.

Figure 3:
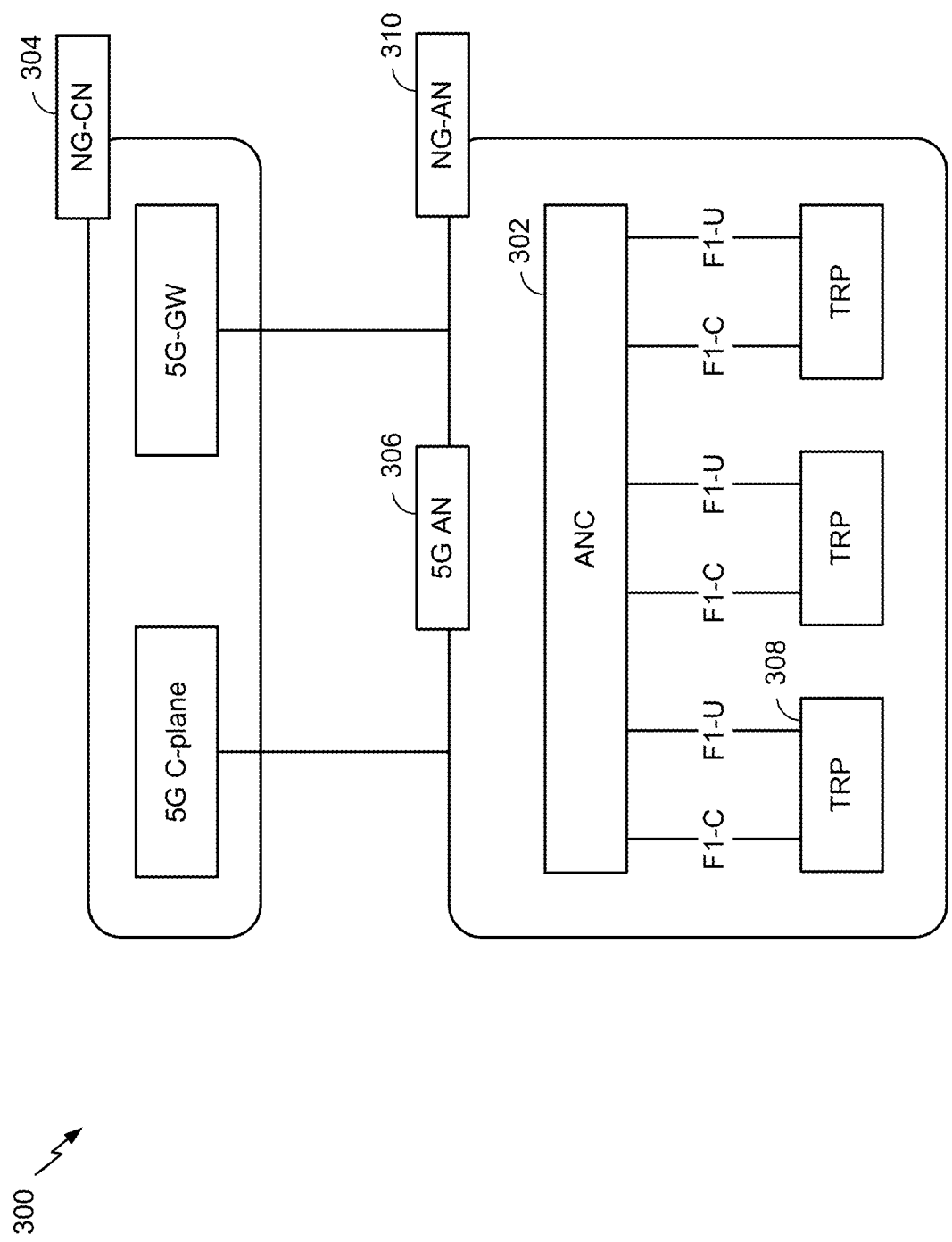
FIG. 3 illustrates an example logical architecture of a distributed radio access network (RAN), in accordance with various aspects of the present disclosure.

FIG. 3 illustrates an example logical architecture of a distributed RAN 300, according to various aspects of the present disclosure.

A 5G access node 306 may include an access node controller (ANC) 302. The ANC 302 may be a central unit (CU) of the distributed RAN 300. The backhaul interface to the next generation core network (NG-CN) 304 may terminate at the ANC 302. The backhaul interface to neighboring next generation access nodes (NG-ANs) may terminate at the ANC 302. The ANC 302 may include one or more TRPs 308 (which may also be referred to as BSs, NR BSs, Node Bs, 5G NBs, APs, gNB, or some other term). As described above, "TRP" may be used interchangeably with "cell." In some aspects, multiple TRPs 308 may be included in a single base station 110. Additionally, or alternatively, different TRPs 308 may be included in different base stations 110.

A TRP 308 may be a distributed unit (DU). A TRP 308 may be connected to a single ANC 502 or multiple ANCs 302. For example, for RAN sharing, radio as a service (RaaS), and service specific AND deployments, a TRP 308 may be connected to more than one ANC 302. A TRP 308 may include one or more antenna ports. The TRPs 308 may be configured to individually (e.g., dynamic selection) or jointly (e.g., joint transmission) serve traffic to a UE 120.

The local architecture of RAN 300 may be used to illustrate fronthaul definition. The architecture may be defined to support fronthauling solutions across different deployment types. For example, the architecture may be based at least in part on transmit network capabilities (e.g., bandwidth, latency, and/or jitter). The architecture may share features and/or components with LTE. According to aspects, the next generation AN (NG-AN) 310 may support dual connectivity with NR. The NG-AN may share a common fronthaul for LTE and NR. The architecture may enable coordination between and among TRPs 308. For example, coordination may be preset within a TRP 308 and/or across TRPs 308 via the ANC 302. According to aspects, no inter-TRP interface may be needed/present.

According to aspects, a dynamic configuration of split logical functions may be present within the architecture of RAN 300. The packet data convergence protocol (PDCP), radio link control (RLC), or medium access control (MAC) protocol may be adaptably placed at the ANC 302 or TRP 308. According to various aspects, a base station 110 may include a central unit (CU) (e.g., ANC 302) and/or one or more distributed units (e.g., one or more TRPs 308).

As indicated above, FIG. 3 is provided merely as an example. Other examples may differ from what is described with regard to FIG. 3.

Figure 4:
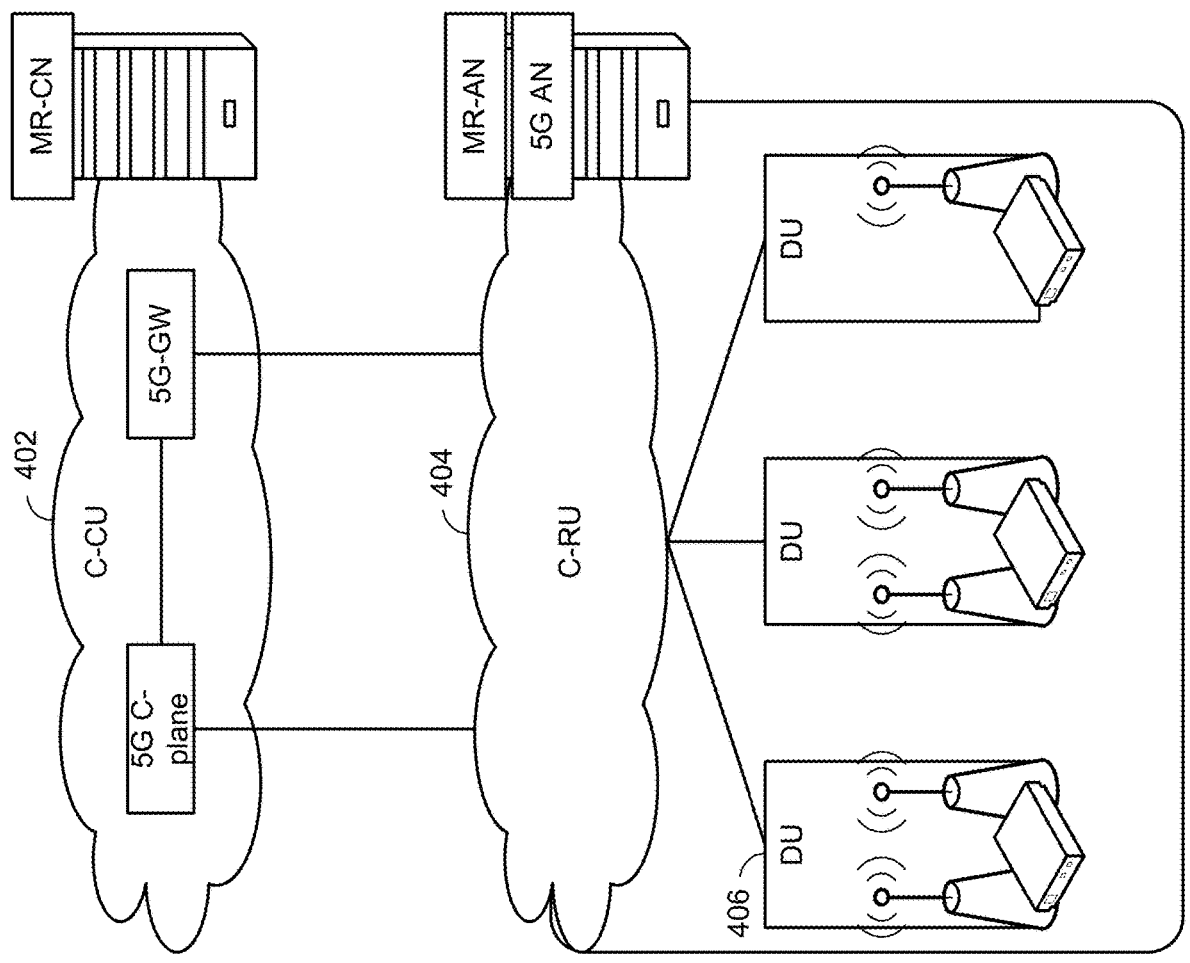
FIG. 4 illustrates an example physical architecture of a distributed RAN, in accordance with various aspects of the present disclosure.

FIG. 4 illustrates an example physical architecture of a distributed RAN 400, according to various aspects of the present disclosure.

A centralized core network unit (C-CU) 402 may host core network functions. The C-CU 402 may be centrally deployed. Functionality of the C-CU may be offloaded (e.g., to advanced wireless services (AWS)), in an effort to handle peak capacity. A centralized RAN unit (C-RU) 404 may host one or more ANC functions. Optionally, the C-RU 404 may host core network functions locally. The C-RU 404 may have distributed deployment. The C-RU 404 may be closer to the network edge. A distributed unit (DU) 406 may host one or more TRPs 308. The DU 406 may be located at edges of the network with radio frequency (RF) functionality.

As indicated above, FIG. 4 is provided merely as an example. Other examples may differ from what is described with regard to FIG. 4.

Figure 5:
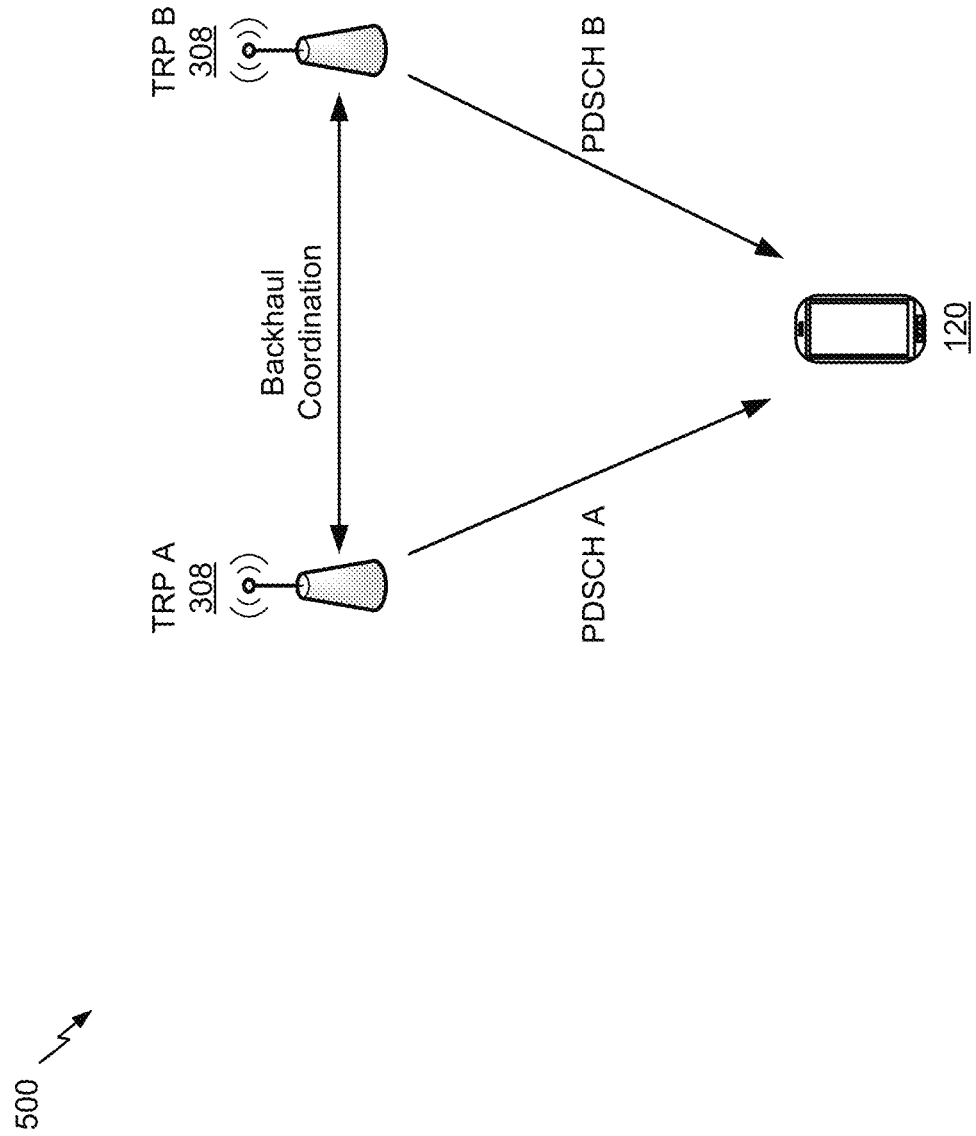
FIG. 5 is a diagram illustrating an example of multi-TRP communication, in accordance with various aspects of the present disclosure.

FIG. 5 is a diagram illustrating an example 500 of multi-TRP communication, in accordance with various aspects of the present disclosure.

As shown in FIG. 5, multiple TRPs 308 (shown as TRP A and TRP B) may communicate with the same UE 120 in a coordinated manner (e.g., using coordinated multipoint transmissions and/or the like) to improve reliability, increase throughput, and/or the like. The TRPs 308 may coordinate such communications via a backhaul, which may have a smaller delay and/or higher capacity when the TRPs 308 are co-located at the same base station 110 (e.g., different antenna arrays of the same base station 110), or may have a larger delay and/or lower capacity when the TRPs 308 are located at different base stations 110.

For example, multiple TRPs 308 may jointly transmit one or more physical downlink control channels (PDCCHs), physical downlink shared channels (PDSCHs), and/or reference signals to the same UE 120. In some aspects, the UE 120 may receive communications via multiple PDSCHs of the multiple TRPs 308, shown as PDSCH A from TRP A and PDSCH B from TRP B. Other examples are contemplated, and in some aspects the number of PDSCHs received by the UE 120 need not be equal to the number of TRPs 308 communicating with the UE 120 (e.g., the TRPs 308 and PDSCHs need not have a one-to-one correspondence). Additionally, or alternatively, TRPs 308 may transmit reference signals to the UE 120, such as a phase tracking reference signal (PTRS) used to correct phase noise, especially for millimeter wave communications. The PTRS is described in more detail below in connection with FIG. 6.

As indicated above, FIG. 5 is provided merely as an example. Other examples may differ from what is described with regard to FIG. 5.

Figure 6:
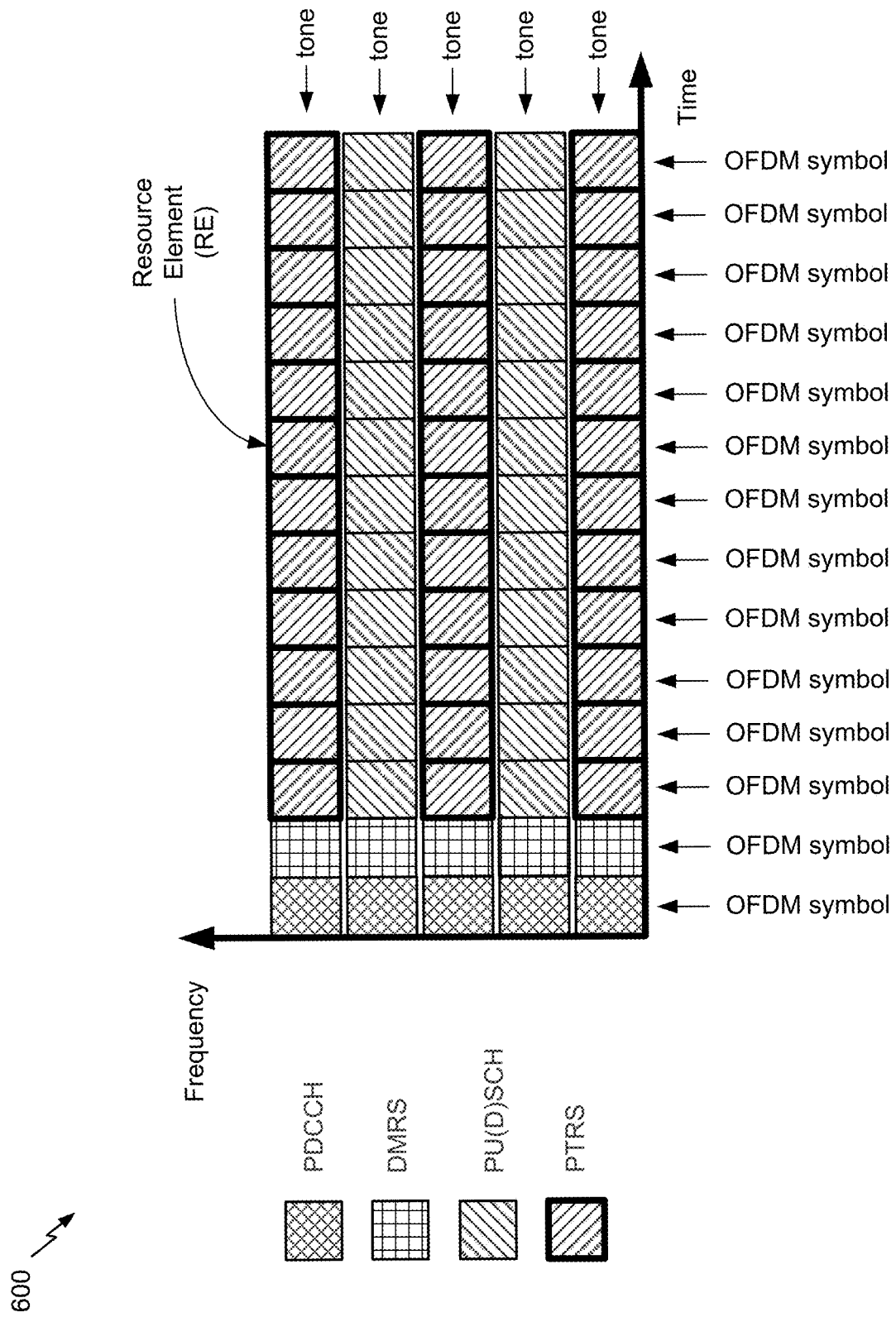
FIG. 6 is a diagram illustrating an example of an assignment of phase tracking reference signals (PTRSs) and other signals and channels to resource elements, in accordance with various aspects of the present disclosure.

FIG. 6 is a diagram illustrating an example 600 of an assignment of PTRSs and other signals and channels to resource elements, in accordance with various aspects of the present disclosure.

FIG. 6 illustrates PTRS pilot signals (also referred to as PTRS pilot tones) for a CP-OFDM communication system. PTRS pilot signals may be continuous (as illustrated) or discontinuous in the time domain. For a UE 120, the PTRS signals may occupy one tone or several tones, based at least in part on a scheduled bandwidth, a modulation and coding scheme (MCS), a signal-to-noise ratio (SNR), an interference level, a port mapping, and/or other attributes that may impact the received signal quality of communication signals.

PTRS pilot signals may be used by the UE 120 to correct oscillator phase noise, especially for millimeter wave communications. A higher SNR in the PTRS pilot signals may provide a more accurate phase error estimation. Accordingly, in some aspects, the PTRS pilot signals may be located in the tones with good channel conditions, high SNR, and/or high signal-to-interference-plus-noise ratio (SINR), which may result in more accurate phase tracking at the UE 120. Increasing the number of PTRS pilot signals may provide more accurate phase error estimation. For example, an increased number of PTRS pilot signals may allow for thermal noise to be averaged out over the larger number of PTRS pilot signals. Additionally, an increased number of PTRS pilot signals may allow for frequency diversity to be exploited.

However, using a large number of PTRS pilot signals may increase overhead. Furthermore, the gain from increasing the number of PTRS pilot signals may saturate for a given number of PTRS pilot signals in a scheduled bandwidth. Accordingly, UEs 120 with a large scheduled bandwidth may use a sparser PTRS frequency domain pattern. Conversely, UEs 120 with a small scheduled bandwidth may use a denser PTRS frequency domain pattern.

The required number of PTRS pilot signals to achieve a certain performance requirement (e.g., a bit error rate less than 0.5%, 1%, 2%, and/or the like), for a given scheduled bandwidth may depend on a number of factors, such as channel conditions, UE speed, UE capability, UE processing power, UE battery charge, mobility, and other factors that may impact a communication system's performance. A communication system with too few PTRS signals may result in more retransmissions due to channel errors, which reduces throughput. A system with too many PTRS signals may utilize valuable system bandwidth for a minimal decrease in channel error rate.

Some communication systems may use a fixed PTRS pattern (e.g., in the time domain and/or frequency domain), such as the PTRS pattern shown in FIG. 6. In this case, the density of PTRS pilot signals may be fixed both in the number of PTRS pilot signals and the resource elements that carry PTRS pilot signals. Alternatively, some communication systems may use a flexible PTRS configuration, where resource elements carrying PTRS pilot tones may be flexibly configured.

As indicated above, FIG. 6 is provided merely as an example. Other examples may differ from what is described with regard to FIG. 6.

Figure 7:
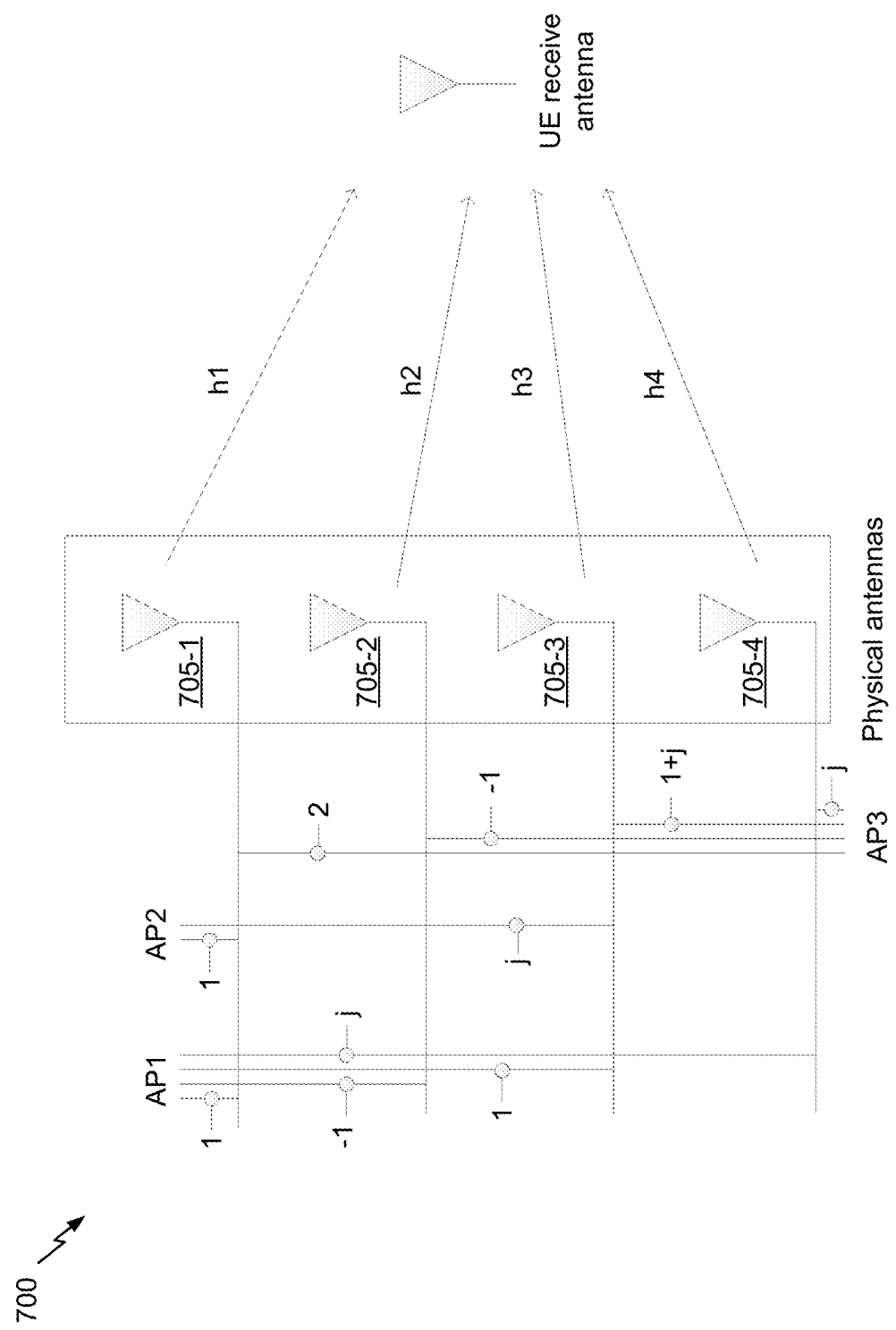
FIG. 7 is a diagram illustrating an example of antenna ports, in accordance with various aspects of the present disclosure.

FIG. 7 is a diagram illustrating an example 700 of antenna ports, in accordance with various aspects of the present disclosure.

As shown in FIG. 7, a first physical antenna 705-1 may transmit information via a first channel h1, a second physical antenna 705-2 may transmit information via a second channel h2, a third physical antenna 705-3 may transmit information via a third channel h3, and a fourth physical antenna 705-4 may transmit information via a fourth channel h4. Such information may be conveyed via a logical antenna port, which may represent some combination of the physical antennas and/or channels. In some cases, a UE 120 may not have knowledge of the channels associated with the physical antennas, and may only operate based on knowledge of the channel associated with antenna ports, as defined below.

An antenna port may be defined such that a channel, over which a symbol on the antenna port is conveyed, can be inferred from a channel over which another symbol on the same antenna port is conveyed. In example 700, a channel associated with antenna port 1 (AP1) is represented as h1−h2+h3+j*h4, where channel coefficients (e.g., 1, −1, 1, and j, in this case) represent weighting factors (e.g., indicating phase and/or gain) applied to each channel. Such weighting factors may be applied to the channels to improve signal power and/or signal quality at one or more receivers. Applying such weighting factors to channel transmissions may be referred to as precoding, and a precoder may refer to a specific set of weighting factors applied to a set of channels.

Similarly, a channel associated with antenna port 2 (AP2) is represented as h1+j*h3, and a channel associated with antenna port 3 (AP3) is represented as 2*h1−h2+(1+j)*h3+j*h4. In this case, antenna port 3 can be represented as the sum of antenna port 1 and antenna port 2 (e.g., AP3=AP1+AP2) because the sum of the expression representing antenna port 1 (h1−h2+h3+j*h4) and the expression representing antenna port 2 (h1+j*h3) equals the expression representing antenna port 3 (2*h1−h2+(1+j)*h3+j*h4). It can also be said that antenna port 3 is related to antenna ports 1 and 2 [AP1,AP2] via the precoder [1,1] because 1 times the expression representing antenna port 1 plus 1 times the expression representing antenna port 2 equals the expression representing antenna port 3.

As indicated above, FIG. 7 is provided merely as an example. Other examples may differ from what is described with regard to FIG. 7.

Figure 8:
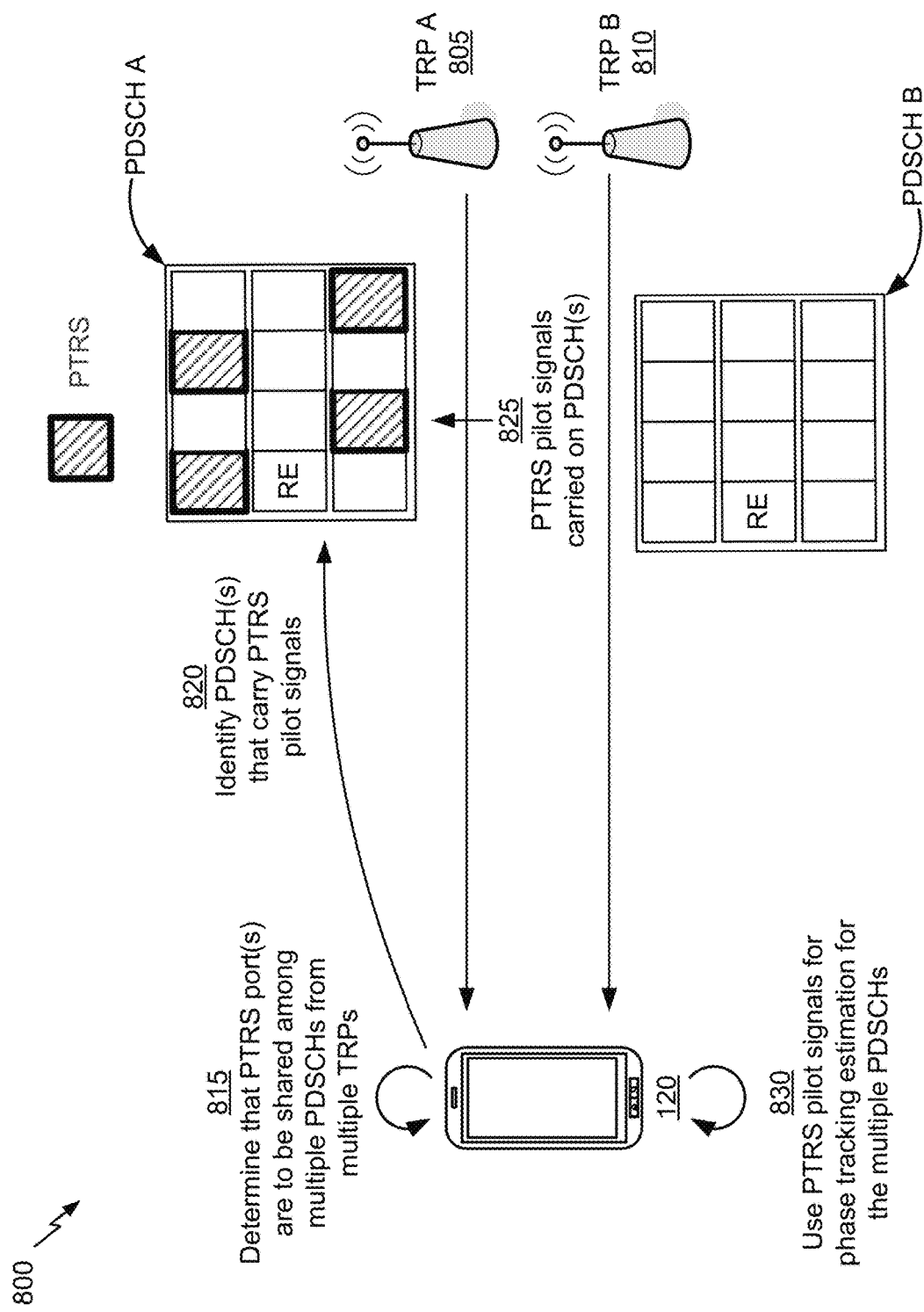
FIGS. 8-10 are diagrams illustrating examples of PTRS port or configuration sharing across multiple physical downlink channels of multiple transmit receive points (TRPs), in accordance with various aspects of the present disclosure.

FIG. 8 is a diagram illustrating an example 800 of PTRS port or configuration sharing across multiple physical downlink channels of TRPs, in accordance with various aspects of the present disclosure.

As shown in FIG. 8, a UE 120 may communicate with a first TRP 805 (shown as TRP A) and a second TRP 810 (shown as TRP B), such as in a multi-TRP communication scheme, a coordinated multipoint communication scheme, and/or the like. As described elsewhere herein, a TRP 805, 810 may correspond to a base station 110, an antenna array of a base station 110, and/or the like. In some aspects, the first TRP 805 and the second TRP 810 may be part of the same base station 110 and/or cell (e.g., different antenna arrays of the same base station 110). In some aspects, the first TRP 805 and the second TRP 810 may be separate base stations 110 and/or cells. In some aspects, the TRPs 805, 810 may be TRPs 308 described elsewhere herein. Although two TRPs are shown as an example, in some aspects more than two TRPs may be used in the multi-TRP communication scheme.

In a multi-TRP mode where multiple PDSCHs (or multiple layers of a PDSCH) are transmitted by multiple TRPs, the UE 120 may need to use PTRS pilot signals to offset phase errors of transmissions associated with the different TRPs and/or PDSCHs. This may increase PTRS overhead when a larger number of PTRS pilot signals are used to perform phase tracking estimation for the multiple TRPs and/or PDSCHs. Some techniques and apparatuses described herein permit one or more PTRS ports to be shared across multiple PDSCHs, which permits phase tracking estimation (e.g., joint phase tracking estimation) using a shared set of PTRS pilot signals to estimate the same phase tracking parameters for the multiple PDSCHs. This may reduce PTRS overhead because fewer PTRS pilot signals are needed to perform phase tracking across the multiple PDSCHs. Additionally, or alternatively, this may increase robustness and improve accuracy of phase tracking estimation, because a larger number of PTRS pilot signals may be used to estimate fewer phase tracking parameters, as compared to using separate PTRS ports and/or PTRS pilot signals to determine separate sets of phase tracking parameters for the multiple PDSCHs. Additional details are described below.

As shown by reference number 815, the UE 120 may determine that one or more PTRS ports (e.g., antenna ports used for PTRS) are to be shared among multiple PDSCHs transmitted by multiple TRPs. In some cases, the multiple PDSCHs and/or the multiple TRPs may have the same or similar channel characteristics with respect to communications with the UE 120, which may result in the same or similar phase error (e.g., phase shift, phase drift, Doppler shift, and/or the like) for different communications transmitted via different PDSCHs and/or different TRPs.

In these cases, the UE 120 may use the same PTRS port(s) for the different PDSCHs for phase tracking estimation (e.g., joint phase tracking estimation) across the different PDSCHs. For example, the UE 120 may use PTRS pilot signals received on those PTRS port(s) to correct phase errors of the different PDSCHs by estimating a same set of phase tracking parameters (e.g., phase error and/or the like) for the different PDSCHs. Thus, in some aspects, the UE 120 may determine that one or more PTRS ports are to be shared among multiple PDSCHs based at least in part on a determination that the multiple PDSCHs are associated with a similar phase error. The UE 120 may make this determination using a variety of techniques, as described below.

In some aspects, the UE 120 may determine that a PTRS port is to be shared among multiple PDSCHs based at least in part on a determination that the multiple PDSCHs are scheduled by the same downlink control information (DCI) (e.g., when a single DCI communication, received in a PDCCH, schedules communications for the multiple PDSCHs). Additionally, or alternatively, the UE 120 may determine that a PTRS port is to be shared among multiple PDSCHs based at least in part on a determination that the multiple PDSCHs use the same set of demodulation reference signal (DMRS) ports (e.g., when the DMRS ports are shared, bundled, transmitted, and/or the like for the multiple PDSCHs).

Additionally, or alternatively, the UE 120 may determine that a PTRS port is to be shared among multiple PDSCHs based at least in part on a determination that the multiple PDSCHs carry the same transport block (TB) (e.g., different layers of the same transport block, a jointly transmitted TB, different portions of the same TB, and/or the like). Additionally, or alternatively, the UE 120 may determine that a PTRS port is to be shared among multiple PDSCHs based at least in part on an explicit indication from a base station 110 (e.g., the first TRP 805, the second TRP 810, and/or the like). In some aspects, such an indication may be included in a radio resource control (RRC) message (e.g., for semi-static configuration). In some aspects, the RRC message may also indicate one or more PDSCHs that carry the PTRS pilot signals, as described in more detail below in connection with reference number 820.

Additionally, or alternatively, the UE 120 may determine that a PTRS port is to be shared among multiple PDSCHs based at least in part on an indication that one or more ports associated with the plurality of PDSCHs are quasi co-located (e.g., with respect to Doppler shift and/or the like) or belong to a group of ports having the same phase shift. The one or more ports of the group of ports may be DMRS ports, PTRS ports, and/or the like. In some aspects, the indication regarding the quasi co-location relationship between ports and/or PDSCHs may be indicated using a transmission control indicator (TCI) state (e.g., which may be indicated by one or more base stations 110). Additionally, or alternatively, a base station 110 may signal the group of ports having the same phase shift (e.g., using one or more fields in an RRC message and/or the like).

Additionally, or alternatively, the UE 120 may determine that a PTRS port is to be shared among multiple PDSCHs based at least in part on a determination that the multiple PDSCHs are scheduled to completely overlap in a time domain (e.g., are completely frequency-division multiplexed with one another, have a nested time domain allocation, and/or the like). For example, if a first PDSCH is scheduled for transmission on symbols 2 through 10, and a second PDSCH is scheduled for transmission on symbols 4 through 8 (or any combination of symbols that includes only one or more of symbols 2 through 10, and no symbols other than symbols 2 through 10), then the UE 120 may determine that a PTRS port is to be shared among the first PDSCH and the second PDSCH. Conversely, if the first PDSCH is scheduled for transmission on symbols 2 through 8, and the second PDSCH is scheduled for transmission on symbols 6 through 10 (or is scheduled on any symbol outside of symbols 2 through 8), then the UE 120 may determine that PTRS ports are not to be shared among the first PDSCH and the second PDSCH. In some aspects, the UE 120 may determine that a PTRS port is to be shared among multiple PDSCHs based at least in part on a determination that the multiple PDSCHS have exactly the same time domain allocation (e.g., are scheduled on the same set of symbols, with no difference in symbols among the multiple PDSCHs).

Additionally, or alternatively, the UE 120 may determine that a PTRS port is to be shared among multiple PDSCHs based at least in part on a determination that the multiple PDSCHs belong to the same component carrier, belong to the same bandwidth part, and/or the like. Additionally, or alternatively, the UE 120 may determine that a PTRS port is to be shared among multiple PDSCHs based at least in part on a combination of the techniques described above.

For example, the UE 120 may determine that a PTRS port is to be shared among multiple PDSCHs based at least in part on a determination that one or more conditions are satisfied for the multiple PDSCHs. The one or more conditions may include one or more of the conditions described above, such as the multiple PDSCHs being scheduled by the same DCI, the multiple PDSCHs using the same set of DMRS ports, the multiple PDSCHs carrying the same TB, one or more ports of the multiple PDSCHs being quasi co-located (e.g., with respect to Doppler shift and/or the like), one or more ports of the multiple PDSCHs belonging to a group of ports having the same phase shift, the multiple PDSCHS being scheduled to completely overlap in a time domain, the multiple PDSCHs belonging to the same component carrier, the multiple PDSCHs belonging to the same bandwidth part, and/or the like.

Additionally, or alternatively, the UE 120 may determine that a PTRS port is to be shared among multiple PDSCHs based at least in part on a determination that one or more conditions are satisfied, and an indication that the PTRS port is to be shared among the multiple PDSCHs when the one or more conditions are satisfied. For example, a base station 110 (e.g., the first TRP 805, the second TRP 810, and/or the like) may indicate, to the UE 120, one or more conditions that, when satisfied, indicate that the UE 120 is to share a PTRS port across multiple PDSCHs. In some aspects, such an indication may be explicit, such as by explicitly identifying the one or more conditions in an RRC message, in DCI, and/or the like. Additionally, or alternatively, the indication may be implicit (e.g., in an RRC message, DCI, and/or the like), such as based at least in part on a size of one or more RRC fields, one or more DCI fields, and/or the like.

In some aspects, the UE 120 may determine that a PTRS port is to be shared among multiple PDSCHs based at least in part on a capability of the UE 120 to support PTRS port sharing among the multiple PDSCHs. For example, some UEs 120 may support such a capability, and some may not. In some aspects, the UE 120 may indicate, in a capability report to a base station 110, whether the UE 120 supports such PTRS port sharing. In some aspects, the base station 110 may configure and/or indicate PTRS port sharing (e.g., using one or more techniques described above) based at least in part on receiving a capability report that indicates that the UE 120 supports PTRS port sharing. In some aspects, the capability report may indicate one or more of the above conditions that the UE 120 is capable of detecting.

Additionally, or alternatively, the UE 120 may determine a number of PTRS ports that are to be shared across the multiple PDSCHs (e.g., based at least in part on a configured number of PTRS ports, based at least in part on a UE capability, based at least in part on an indication from a base station 110, based at least in part on one or more techniques described above, and/or the like).

As shown by reference number 820, the UE 120 may identify one or more PDSCHs, of the multiple PDSCHs for which the PTRS port(s) are to be shared, that carry PTRS pilot signals. For example, the PTRS pilot signals may be carried by a single PDSCH, by all of the multiple PDSCHs, or by a subset of the multiple PDSCHs (e.g., more than a single PDSCH but fewer than all of the multiple PDSCHs). FIG. 8 illustrates an example where PTRS pilot signals are carried by a single PDSCH. An example of PTRS pilot signals being carried by multiple PDSCHs is described in more detail below in connection with FIG. 9.

As shown in FIG. 8, in some aspects, the PTRS pilot signals may be carried by a single PDSCH of the multiple PDSCHs. In FIG. 8, the PTRS pilot signals are shown as being carried by a first PDSCH, shown as PDSCH A (e.g., transmitted by TRP A), and are not carried by a second PDSCH, shown as PDSCH B (e.g., transmitted by TRP B). The UE 120 may identify the single PDSCH that carries the PTRS pilot signals using a variety of techniques, as described below. While these techniques are described, in connection with example 800, for identifying a single PDSCH that carries the PTRS pilot signals, in some aspects such techniques may be used to identify a subset of the multiple PDSCHs that carry the PTRS pilot signals.

In some aspects, the UE 120 may identify the PDSCH(s) that carry the PTRS pilot signals based at least in part on an indication from a base station 110 (e.g., the first TRP 805, the second TRP 810, and/or the like). The indication may be included in, for example, an RRC message, DCI, and/or the like. In some aspects, the indication may be explicit (e.g., using one or more fields dedicated to explicitly indicate the PDSCH(s) to be used to carry the PTRS pilot signals). In some aspects, the indication may be implicit. For example, the UE 120 may identify the PDSCH(s) that carry the PTRS pilot signals based at least in part on an ordering of multiple PDSCHs in a message, such as an RRC message, DCI (e.g., when the multiple PDSCHs are scheduled by the same DCI), and/or the like.

For example, the message may indicate multiple parameters (e.g., multiple MCSs, multiple resource allocations, multiple bandwidths, and/or the like), where each parameter corresponds to a PDSCH of the multiple PDSCHs. In this case, the order in which the parameters appear may indicate the PDSCH(s) that carry the PTRS ports. For example, DCI may indicate, in a list, a first MCS for a first PDSCH, followed by a second MCS for a second PDSCH. In some cases, the first parameter in the list may correspond to the PDSCH that carries the PTRS pilot signals, in which case the UE 120 may determine that the first PDSCH carries the PTRS pilot signals. In some cases, the last parameter in the list may correspond to the PDSCH that carries the PTRS pilot signals, in which case the UE 120 may determine that the second PDSCH carries the PTRS pilot signals. A similar technique may be applied when a subset of the PDSCHs carry PTRS pilot signals. For example, the UE 120 may identify two (or three, etc.) PDSCHs, corresponding to the first two (or three, etc.) parameters in the list or the last two (or three, etc.) parameters in the list, as the PDSCHs that carry the PTRS pilot signals.

Additionally, or alternatively, the UE 120 may identify the PDSCH(s) that carry the PTRS pilot signals based at least in part on multiple identifiers, where each identifier corresponds to a PDSCH of the multiple PDSCHs. Such an identifier may include, for example, a control resource set (CORESET) identifier, a physical cell identifier, a virtual cell identifier, a quasi co-location (QCL) identifier, a QCL group identifier, a bandwidth part identifier, and/or the like.

In some aspects, the UE 120 may identify a PDSCH (or a subset of PDSCHs) that carries PTRS pilot signals based at least in part on a determination that an identifier matches a preconfigured identifier and/or satisfies a condition (e.g., with respect to other identifiers corresponding to other PDSCHs of the multiple PDSCHs). For example, the base station 110 may indicate an identifier to be used for determining the PDSCH that carries the PTRS pilot signals, and the UE 120 may identify the PDSCH associated with the indicated identifier. In some aspects, the indication may explicitly include the identifier. In some aspects, the indication may identify a condition for the identifier, such as a smallest identifier of all identifiers corresponding to all PDSCHs of the multiple PDSCHs, a largest identifier of all identifiers corresponding to all PDSCHs of the multiple PDSCHs, an identifier associated with a master cell (or master cell group), an identifier of the cell carrying the initial synchronization signal block (SSB), and/or the like. Alternatively, the UE 120 may use one of these conditions by default (e.g., based at least in part on a telecommunication standard), without receiving an indication from the base station 110.

Additionally, or alternatively, the UE 120 may identify the PDSCH(s) that carry the PTRS pilot signals based at least in part on multiple bandwidths, where each bandwidth corresponds to a PDSCH of the multiple PDSCHs. For example, the UE 120 may identify the PDSCH (or subset of PDSCHs) with the largest bandwidth, among the multiple PDSCHs, as the PDSCH (or subset of PDSCHs) that carries the PTRS pilot signals. In this way, a better phase tracking estimation may be achieved as compared to using a smaller bandwidth. In some aspects, the UE 120 may use this technique when the multiple PDSCHs are scheduled by the same DCI. In some aspects, the multiple bandwidths, corresponding to the multiple PDSCHs, may be indicated in the same DCI.

Additionally, or alternatively, the UE 120 may identify the PDSCH(s) that carry the PTRS pilot signals based at least in part on feedback provided by the UE 120 to the base station 110. For example, the UE 120 may request a preferred layer mapping for PTRS, a joint layer for PTRS ports, one or more PDSCHs that the UE 120 requests to carry the PTRS pilot signals (e.g., indicated using a QCL identifier, a QCL group identifier, a cell identifier, and/or one or more other identifiers described above), and/or the like. In some aspects, the UE 120 may request that the PTRS pilot signals be carried in a specific set of PDSCHs (e.g., a single PDSCH or a subset of PDSCHs), or that the PTRS pilot signals be carried in all PDSCHs of the multiple PDSCHs. The base station 110 may transmit PTRS pilot signals according to the request(s) from the UE 120.

As shown by reference number 825, one or more TRPs, of the multiple TRPs, may transmit PTRS pilot signals on the one or more PDSCHs, and the UE 120 may receive the PTRS pilot signals on the one or more PDSCHs. The TRP(s) may determine the PDSCH(s) in which the PTRS pilot signals are to be transmitted (e.g., in a similar manner as described above), and may transmit the PTRS pilot signals in the determined PDSCH(s). In example 800, TRP A transmits the PTRS pilot signals in PDSCH A, and the PTRS pilot signals are not transmitted in PDSCH B, thereby reducing PTRS overhead. In some aspects, the PTRS pilot signals may be transmitted according to a PTRS pattern, as described in more detail elsewhere herein. The PTRS pattern may indicate the resource elements (e.g., within a resource block) that carry PTRS pilot signals.

As shown by reference number 830, the UE 120 may use the PTRS pilot signals for phase tracking estimation (e.g., joint phase tracking estimation) for the multiple PDSCHs. In some aspects, the UE 120 may use the PTRS pilot signals for phase tracking estimation based at least in part on the determination that the PTRS port(s) are to be shared among the multiple PDSCHs. When a PTRS port is shared among multiple PDSCHs, the UE 120 may assume that those PDSCHs have the same (or similar) phase error (e.g., phase shift, phase drift, Doppler shift, and/or the like). Thus, the UE 120 may use different PTRS pilot signals, received on the shared PTRS port, to estimate a same set of phase tracking parameters (e.g., phase error and/or the like) for the multiple PDSCHs.

In this way, PTRS overhead may be reduced by using fewer PTRS pilot signals to perform phase tracking across the multiple PDSCHs (e.g., rather than transmitting separate PTRS pilots using separate PTRS ports for different PDSCHs). Furthermore, robustness and accuracy of phase tracking estimation may be improved because a larger number of PTRS pilot signals are used to estimate fewer phase tracking parameters, as compared to using separate PTRS pilot signals and/or separate PTRS ports to determine separate sets of phase tracking parameters for the multiple PDSCHs.

As indicated above, FIG. 8 is provided merely as an example. Other examples may differ from what is described with regard to FIG. 8.

Figure 9:
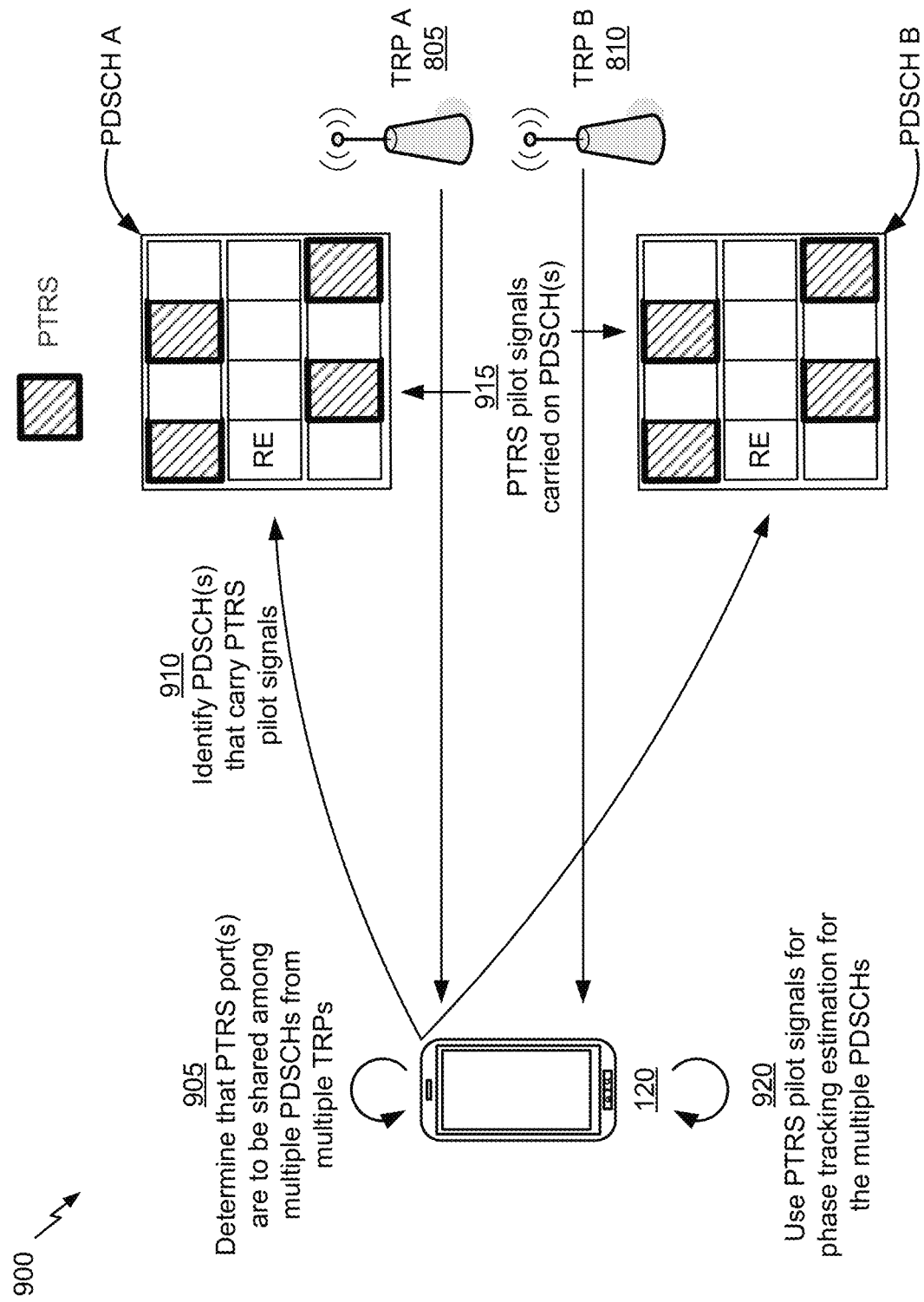

FIG. 9 is a diagram illustrating another example 900 of PTRS port or configuration sharing across multiple physical downlink channels of TRPs, in accordance with various aspects of the present disclosure.

As shown in FIG. 9, a UE 120 may communicate with a first TRP 805 (shown as TRP A) and a second TRP 810 (shown as TRP B), such as in a multi-TRP communication scheme, a coordinated multipoint communication scheme, and/or the like, as described above in connection with FIG. 8. As shown by reference number 905, the UE 120 may determine that one or more PTRS ports are to be shared among multiple PDSCHs transmitted by multiple TRPs, as described above in connection with FIG. 8.

As shown by reference number 910, the UE 120 may identify one or more PDSCHs, of the multiple PDSCHs for which the PTRS port(s) are to be shared, that carry PTRS pilot signals. For example, the PTRS pilot signals may be carried by a single PDSCH, by all of the multiple PDSCHs, or by a subset of the multiple PDSCHs (e.g., more than a single PDSCH but fewer than all of the multiple PDSCHs). In some aspects, the UE 120 may determine whether the PTRS pilot signals are to be carried by a single PDSCH, a subset of PDSCHs, or all PDSCHs. For example, the base station 110 may indicate whether the PTRS pilot signals are to be carried by a single PDSCH, a subset of PDSCHs, or all PDSCHs. Additionally, or alternatively, the UE 120 may determine whether the PTRS pilot signals are to be carried by a single PDSCH, a subset of PDSCHs, or all PDSCHs based at least in part on a predetermined configuration (e.g., according to a telecommunication standard), information associated with the multiple TRPs, information associated with the multiple PDSCHs, channel conditions, and/or the like.

As shown in FIG. 9, in some aspects, the PTRS pilot signals may be carried by multiple PDSCHs, which may include all of the PDSCHs or a subset of the PDSCHs. In example 900, the PTRS port(s) are shared between a first PDSCH, shown as PDSCH A (e.g., transmitted by TRP A), and a second PDSCH, shown as PDSCH B (e.g., transmitted by TRP B). In this example, the PTRS pilot signals are carried by PDSCH A and PDSCH B, as shown.

In some aspects, the PTRS pilot signals may be carried on more than one PDSCH but fewer than all of the PDSCHs. For example, the UE 120 may be configured with a first PDSCH and a second PDSCH that are scheduled to occur in the same symbols, and may be configured with a third PDSCH that is disjoint in symbols from the first PDSCH and the second PDSCH (e.g., that occurs in one or more different symbols than the first and second PDSCHs). As used herein, disjoint means that all of the symbols are different (and not just one or more of the symbols). In this case, the third PDSCH may carry PTRS pilot signals for phase tracking estimation of the third PDSCH, and one of the first PDSCH or the second PDSCH may carry PTRS pilot signals for phase tracking estimation of the first PDSCH and the second PDSCH. In this case, the other of the first PDSCH or the second PDSCH may not carry PTRS pilot signals (e.g., in a similar manner as described above in connection with FIG. 8).

As shown by reference number 915, the multiple TRPs (e.g., TRP A and TRP B) may transmit PTRS pilot signals on the PDSCHs for which the PTRS port(s) are to be shared, and the UE 120 may receive the PTRS pilot signals on those PDSCHs. The PTRS pilot signals may be transmitted and/or received according to a PTRS pattern. The PTRS pattern may indicate the resource elements (e.g., within a resource block, a resource grid, and/or the like) that carry PTRS pilot signals. Thus, the PTRS pattern may have a particular density (e.g., a number of resource elements per resource block and/or the like) in the time domain and/or the frequency domain according to the PTRS pattern.

In some aspects, the PTRS patterns used for different PDSCHs may be independent of one another (e.g., may be selected independently of one another). As a result, in some aspects, the different PDSCHs may use different PTRS patterns for transmission of PTRS pilot signals. Alternatively, as shown in FIG. 9, in some aspects, the same PTRS pattern may be used across multiple PDSCHs (e.g., all PDSCHs or a subset of the PDSCHs). In this case, the UE 120 may identify the PTRS pattern to be used for the multiple PDSCHs using one or more techniques described below. In some aspects, the UE 120 may indicate a capability regarding whether the UE 120 supports independent PTRS patterns for different PDSCHs or the same PTRS pattern across PDSCHs.

In some aspects, the UE 120 may identify a PTRS pattern for a specific PDSCH based at least in part on a PTRS configuration for that PDSCH. The PTRS configuration may indicate multiple PTRS patterns, and may also indicate, for each PTRS pattern, a set of conditions (e.g., one or more conditions) in which that PTRS pattern is to be applied. The set of conditions may include, for example, one or more MCSs for which a PTRS pattern is to be applied, one or more physical resource blocks (PRBs) for which a PTRS pattern is to be applied, and/or the like. The UE 120 may determine which condition is satisfied (e.g., which MCS is used for the PDSCH, which PRBs carry the PDSCH, and/or the like), and may identify the PTRS pattern that corresponds to that condition. In some aspects, the PTRS configuration may be indicated in an RRC message and/or the like. Additional details regarding PTRS configurations are described below in connection with FIG. 10.

In some aspects, the UE 120 may identify a PTRS pattern corresponding to each PDSCH on which PTRS pilot signals are to be transmitted, and may determine a density of each identified PTRS pattern (e.g., a number of resource elements per resource block). The UE 120 may determine which PTRS pattern has the highest density (e.g., the densest pattern, the pattern with the largest number of resource elements per resource block, and/or the like) as compared to the other identified PTRS patterns, and may use that PTRS across the multiple PDSCHs. In this way, the robustness of phase tracking estimates may be improved. Alternatively, the UE 120 may determine which PTRS pattern has the lowest density (e.g., the sparsest pattern, the pattern with the fewest number of resource elements per resource block, and/or the like) as compared to the other identified PTRS patterns, and may use that PTRS across the multiple PDSCHs. In this way, PTRS overhead may be reduced.

Additionally, or alternatively, the UE 120 may identify the PTRS pattern using one or more techniques described above (e.g., in FIG. 8) in connection with identifying the PDSCH(s) that carry the PTRS pilot signals. In this case, the UE 120 may use one or more of these techniques to identify a PDSCH (e.g., from which the shared PTRS pattern is to be derived), may determine a PTRS pattern for that PDSCH (e.g., using a PTRS configuration, as described above), and may use that PTRS pattern to receive PTRS pilot signals across the multiple PDSCHs (e.g., using the same PTRS pattern on the multiple PDSCHs).

For example, the UE 120 may identify the PTRS pattern based at least in part on an indication from a base station 110 (e.g., in an RRC message, in DCI, and/or the like), based at least in part on respective identifiers corresponding to the multiple PDSCHs, based at least in part on respective bandwidths corresponding to the multiple PDSCHs, based at least in part on an ordering of the multiple PDSCHs in an RRC message and/or DCI, based at least in part on feedback provided by the UE 120 to a base station 110, and/or the like.

As shown by reference number 920, the UE 120 may use the PTRS pilot signals for phase tracking estimation (e.g., joint phase tracking estimation) for the multiple PDSCHs, as described above in connection with FIG. 8. In this way, robustness and accuracy of phase tracking estimation may be improved, because a larger number of PTRS pilot signals are used to estimate fewer phase tracking parameters, as compared to using separate PTRS pilot signals and/or separate PTRS ports to determine separate sets of phase tracking parameters for the multiple PDSCHs.

As indicated above, FIG. 9 is provided merely as an example. Other examples may differ from what is described with regard to FIG. 9.

Figure 10:
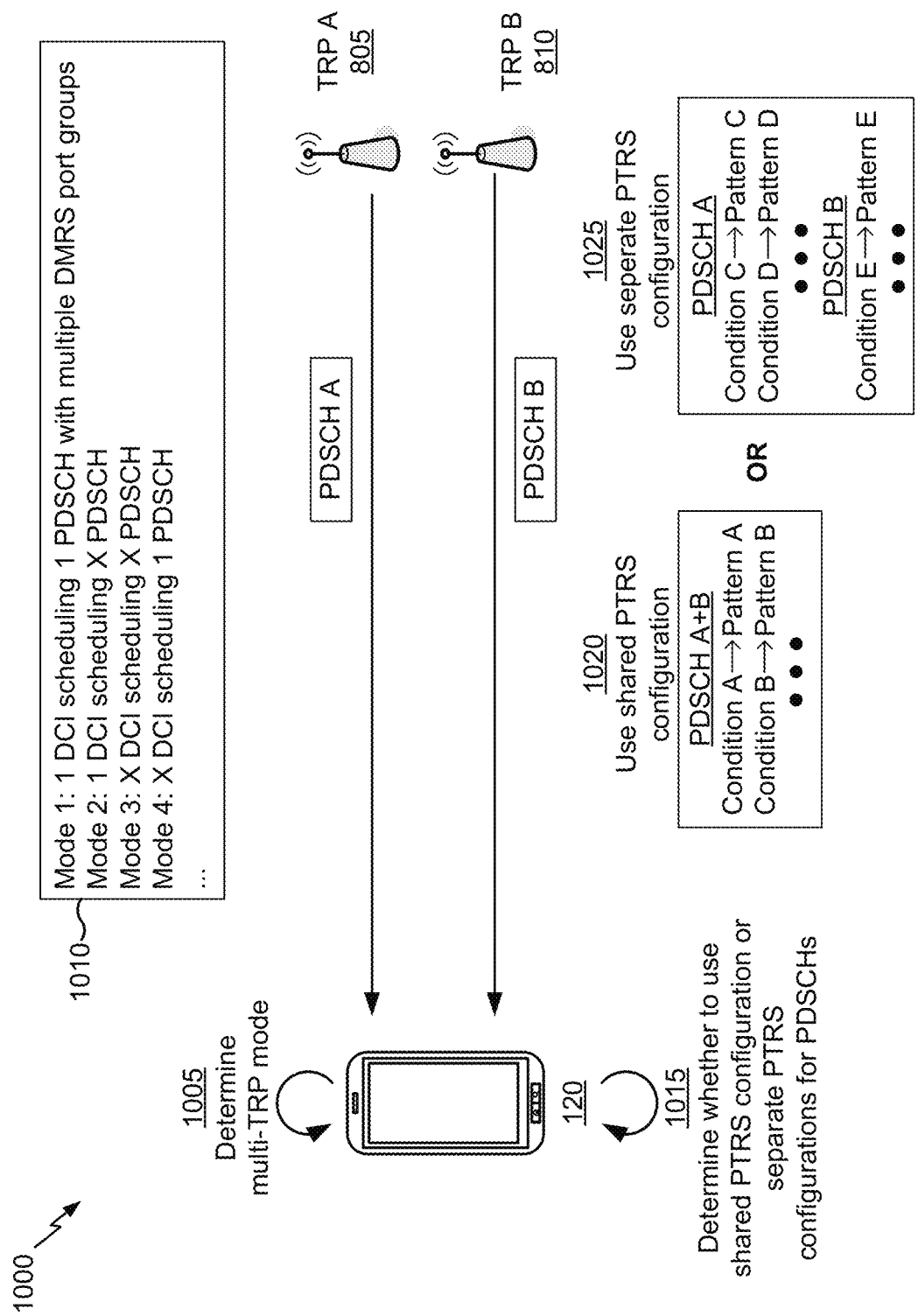

FIG. 10 is a diagram illustrating another example 1000 of PTRS port or configuration sharing across multiple physical downlink channels of TRPs, in accordance with various aspects of the present disclosure.

As shown in FIG. 10, a UE 120 may communicate with a first TRP 805 (shown as TRP A) and a second TRP 810 (shown as TRP B), such as in a multi-TRP communication scheme, a coordinated multipoint communication scheme, and/or the like, as described above in connection with FIGS. 8-9.

As shown by reference number 1005, the UE 120 may determine that the UE 120 is to communicate with multiple TRPs using a specific multi-TRP mode. The specific multi-TRP mode may indicate a number of DCI communications to be used for scheduling and a number of PDSCHs to be scheduled by the number of DCI communications. That number of PDSCHs may be transmitted by the multiple TRPs (e.g., a first PDSCH from a first TRP, a second PDSCH from a second TRP, and/or the like). In some aspects, the specific multi-TRP mode may be indicated to the UE 120 by a base station 110 (e.g., the first TRP 805, the second TRP 810, and/or the like).

As shown by reference number 1010, in some aspects, the multi-TRP mode may be a first multi-TRP mode (shown as Mode 1) that indicates that a single DCI communication is to be used to schedule a single PDSCH transmitted by the multiple TRPs. In this mode, the single PDSCH may use multiple DMRS port groups (e.g., respective DMRS port groups for the multiple TRPs) and/or different TRPs may transmit different layers of the same transport block (e.g., in different QCL groups). In some aspects, in this mode, the single PDSCH may be associated with multiple QCL assumptions.

In some aspects, the multi-TRP mode may be a second multi-TRP mode (shown as Mode 2) that indicates that a single DCI communication is to be used to schedule multiple PDSCHs transmitted by the multiple TRPs. The single DCI communication may be transmitted by a single TRP, or may be jointly transmitted by multiple TRPs (e.g., using different layers). In this mode, each PDSCH may be scheduled by one TRP. In some aspects, each PDSCH may be associated with one QCL assumption.

In some aspects, the multi-TRP mode may be a third multi-TRP mode (shown as Mode 3) that indicates that multiple DCI communications are to be used to schedule multiple PDSCHs transmitted by the multiple TRPs. In this mode, each DCI may be transmitted by a different TRP, and each DCI may schedule a corresponding PDSCH. In some aspects, each PDSCH may be associated with one QCL assumption.

In some aspects, the multi-TRP mode may be a fourth multi-TRP mode (shown as Mode 4) that indicates that multiple DCI communications are to be used to schedule a single PDSCH transmitted by the multiple TRPs. In this mode, each DCI may be transmitted by a different TRP, and each DCI may schedule the same PDSCH. In some aspects, the PDSCH may be associated with multiple QCL assumptions.

As shown by reference number 1015, the UE 120 may determine whether to use a shared PTRS configuration or separate PTRS configurations for the multiple PDSCHs transmitted by the multiple TRPs, based at least in part on the specific multi-TRP mode. The shared PTRS configuration may be shared across PDSCHs, while the separate PTRS configurations may be per PDSCH. The UE 120 may selectively use either the shared PTRS configuration or the separate PTRS configurations for phase tracking estimation on the PDSCHs based at least in part on the determination, as described in more detail below.

As described above in connection with FIG. 9, a PTRS configuration may indicate multiple PTRS patterns, and may also indicate, for each PTRS pattern, a set of conditions for which that PTRS pattern is to be applied (e.g., a set of MCSs for which that PTRS pattern is to be applied, a set of PRBs for which that PTRS pattern is to be applied, and/or the like). For a shared PTRS configuration, the UE 120 and the base station 110 may use the same set of PTRS patterns and corresponding conditions across PDSCHs. For separate PTRS configurations, the UE 120 and the base station 110 may use different sets of PTRS patterns and corresponding conditions for different PDSCHs. In some aspects, the PTRS configuration (e.g., the shared PTRS configuration and/or the separate PTRS configurations) may be indicated in an RRC message from the base station 110 to the UE 120.

In some aspects, the UE 120 may determine to use the shared PTRS configuration when the specific multi-TRP mode is the first multi-TRP mode. In this mode, a single DCI communication schedules a single PDSCH, so a single PTRS configuration may be indicated for the single PDSCH.

In some aspects, the UE 120 may determine whether to use the shared PTRS configuration or the separate PTRS configurations based at least in part on an indication in an RRC message. Such an indication may be explicit (e.g., using bit(s) and/or a field that explicitly indicates whether to use a shared PTRS configuration or separate PTRS configurations), or may be implicit (e.g., based at least in part on a number of PTRS configurations that are indicated). For example, in the second multi-TRP mode and the third multi-TRP mode, which both include multiple PDSCHs, the base station 110 may indicate whether to use a shared PTRS configuration across the multiple PDSCHs or separate PTRS configurations for each of the multiple PDSCHs. In some aspects, the indication from the base station 110 may be based at least in part on a UE capability to support a shared PTRS configuration and/or separate PTRS configurations. In this case, the UE 120 may transmit a capability report indicating such a capability to the base station 110, and may determine whether to use the shared PTRS configuration or the separate PTRS configurations based at least in part on the capability report.

In some aspects, the content and/or size of DCI may depend on the specific multi-TRP mode to be used and/or whether PTRS port sharing is configured (e.g., as described above in connection with FIGS. 8-9). For example, in the second multi-TRP mode, where a single DCI communication schedules multiple PDSCHs, the DCI communication may be smaller if PTRS port sharing is configured (e.g., to communicate less information regarding PTRS pilot signals), and may be larger if PTRS port sharing is not configured (e.g., to communicate more information regarding PTRS pilot signals). As another example, in the third multi-TRP mode, where multiple DCI communications schedule multiple PDSCHs, each DCI communication may be the same size if PTRS port sharing is not configured (e.g., to carry information regarding PTRS pilot signals per PDSCH), and may be the same size or different sizes if PTRS port sharing is configured. For example, when PTRS port sharing is configured, the DCI communications may be the same size if the same information regarding PTRS pilot signals is included in each DCI communication (e.g., for robustness, repetition, diversity, and/or the like), or may be different sizes if information regarding PTRS pilot signals is not included in all of the DCI communications (e.g., to conserve resources).

In some aspects, each DCI communication may be the same size. For example, the fourth multi-TRP mode uses multiple DCI communications to schedule a single PDSCH. In this case, to obtain benefits of robustness, repetition, diversity, and/or the like, each of the multiple DCI communications may indicate the same PTRS configuration for the single PDSCH. Alternatively, in some aspects, information regarding the PTRS pilot signals may be carried in only a single DCI communication of the multiple DCI communications, thereby conserving resources.

As shown by reference number 1020, in some aspects, the UE 120 may use the shared PTRS configuration across the PDSCHs for phase tracking estimation (e.g., joint phase tracking estimation). In this case, the same set of PTRS patterns and corresponding conditions may be applied across PDSCHs. In example 1000, the first TRP 805 transmits a first PDSCH, shown as PDSCH A, and the second TRP 810 transmits a second PDSCH, shown as PDSCH B. As shown, for the shared PTRS configuration, the same set of PTRS patterns and corresponding conditions may be used for both PDSCH A and PDSCH B. In this way, resources for indicating the PTRS configuration may be conserved, and/or a shared PTRS configuration may be used when the PDSCHs have similar channel conditions.

As shown by reference number 1025, in some aspects, the UE 120 may use separate PTRS configurations, per PDSCH, for phase tracking estimation (e.g., joint phase tracking estimation). In this case, different sets of PTRS patterns and corresponding conditions may be applied on different PDSCHs. In example 1000, for the separate PTRS configurations, different sets of PTRS patterns and corresponding conditions may be used for PDSCH A as compared to PDSCH B. In this way, the PTRS configuration may be flexibly configured for different PDSCHs, which may have different channel conditions or other differences resulting in improved performance when different PTRS configurations are used.

As indicated above, FIG. 10 is provided merely as an example. Other examples may differ from what is described with regard to FIG. 10.

Figure 11:
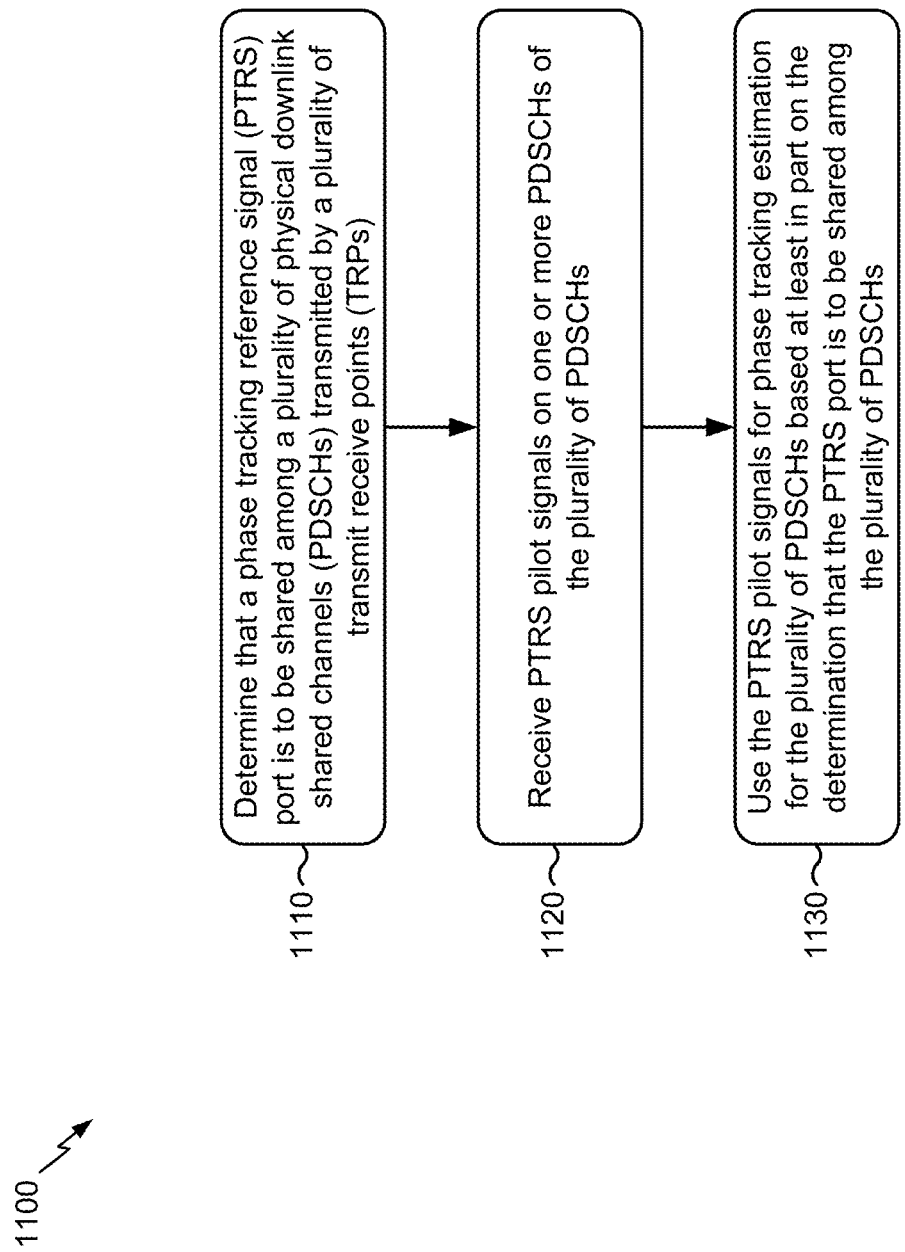
FIGS. 11-12 are diagrams illustrating an example process performed, for example, by a user equipment, in accordance with various aspects of the present disclosure.

FIG. 11 is a diagram illustrating an example process 1100 performed, for example, by a UE, in accordance with various aspects of the present disclosure. Example process 1100 is an example where a UE (e.g., UE 120 and/or the like) performs operations associated with PTRS port or configuration sharing across multiple physical downlink channels of TRPs.

As shown in FIG. 11, in some aspects, process 1100 may include determining that a PTRS port is to be shared among a plurality of PDSCHs transmitted by a plurality of TRPs (block 1110). For example, the UE (e.g., using controller/processor 280 and/or the like) may determine that a PTRS port is to be shared among a plurality of PDSCHs transmitted by a plurality of TRPs, as described above in connection with FIGS. 8-9.

As further shown in FIG. 11, in some aspects, process 1100 may include receiving PTRS pilot signals on one or more PDSCHs of the plurality of PDSCHs (block 1120). For example, the UE (e.g., using antenna 252, DEMOD 254, MIMO detector 256, receive processor 258, controller/processor 280, and/or the like) may receive PTRS pilot signals on one or more PDSCHs of the plurality of PDSCHs, as described above in connection with FIGS. 8-9.

As further shown in FIG. 11, in some aspects, process 1100 may include using the PTRS pilot signals for phase tracking estimation for the plurality of PDSCHs based at least in part on the determination that the PTRS port is to be shared among the plurality of PDSCHs (block 1130). For example, the UE (e.g., using controller/processor 280 and/or the like) may use the PTRS pilot signals for phase tracking estimation for the plurality of PDSCHs based at least in part on the determination that the PTRS port is to be shared among the plurality of PDSCHs, as described above in connection with FIGS. 8-9.

Process 1100 may include additional aspects, such as any single aspect or any combination of aspects described below and/or in connection with one or more other processes described elsewhere herein.

In a first aspect, using the PTRS pilot signals for phase tracking estimation for the plurality of PDSCHs comprises using different PTRS, of the PTRS pilot signals, to estimate a same set of phase tracking parameters for the plurality of PDSCHs.

In a second aspect, alone or in combination with the first aspect, the determination that the PTRS port is to be shared among the plurality of PDSCHs is based at least in part on a determination that the plurality of PDSCHs are scheduled by the same downlink control information.

In a third aspect, alone or in combination with one or more of the first and second aspects, the determination that the PTRS port is to be shared among the plurality of PDSCHs is based at least in part on a determination that the plurality of PDSCHs use the same set of demodulation reference signal (DMRS) ports.

In a fourth aspect, alone or in combination with one or more of the first through third aspects, the determination that the PTRS port is to be shared among the plurality of PDSCHs is based at least in part on a determination that the plurality of PDSCHs carry the same transport block.

In a fifth aspect, alone or in combination with one or more of the first through fourth aspects, the determination that the PTRS port is to be shared among the plurality of PDSCHs is based at least in part on an explicit indication from a base station.

In a sixth aspect, alone or in combination with one or more of the first through fifth aspects, the explicit indication is indicated in a radio resource control (RRC) message.

In a seventh aspect, alone or in combination with one or more of the first through sixth aspects, the determination that the PTRS port is to be shared among the plurality of PDSCHs is based at least in part on an indication that one or more ports associated with the plurality of PDSCHs are quasi co-located with respect to Doppler shift or belong to a group of ports having the same phase shift.

In an eighth aspect, alone or in combination with one or more of the first through seventh aspects, the one or more ports include one or more PTRS ports or one or more DMRS ports.

In a ninth aspect, alone or in combination with one or more of the first through eighth aspects, the determination that the PTRS port is to be shared among the plurality of PDSCHs is based at least in part on a determination that the plurality of PDSCHS are scheduled to completely overlap in a time domain.

In a tenth aspect, alone or in combination with one or more of the first through ninth aspects, the determination that the PTRS port is to be shared among the plurality of PDSCHs is based at least in part on a determination that the plurality of PDSCHs belong to the same component carrier or bandwidth part.

In an eleventh aspect, alone or in combination with one or more of the first through tenth aspects, the determination that the PTRS port is to be shared among the plurality of PDSCHs is based at least in part on a determination that a condition is satisfied for the plurality of PDSCHs and an indication that the PTRS port is to be shared among the plurality of PDSCHs when the condition is satisfied.

In a twelfth aspect, alone or in combination with one or more of the first through eleventh aspects, the indication includes an explicit indication in at least one of an RRC message or downlink control information (DCI).

In a thirteenth aspect, alone or in combination with one or more of the first through twelfth aspects, the indication includes an implicit indication in at least one of an RRC message or DCI.

In a fourteenth aspect, alone or in combination with one or more of the first through thirteenth aspects, the condition includes at least one of: the plurality of PDSCHs being scheduled by the same downlink control information, the plurality of PDSCHs using the same set of DMRS ports, the plurality of PDSCHs carrying the same transport block, one or more ports, associated with the plurality of PDSCHs, being quasi co-located with respect to Doppler shift or belonging to a group of ports having the same phase shift, the plurality of PDSCHs being scheduled to completely overlap in a time domain, the plurality of PDSCHs belonging to the same component carrier or bandwidth part, or a combination thereof.

In a fifteenth aspect, alone or in combination with one or more of the first through fourteenth aspects, the determination that the PTRS port is to be shared among the plurality of PDSCHs is based at least in part on a capability of the UE to support PTRS port sharing among the plurality of PDSCHs.

In a sixteenth aspect, alone or in combination with one or more of the first through fifteenth aspects, the UE may be configured to identify the one or more PDSCHs that carry the PTRS pilot signals.

In a seventeenth aspect, alone or in combination with one or more of the first through sixteenth aspects, the one or more PDSCHs that carry the PTRS pilot signals include all PDSCHs in the plurality of PDSCHs.

In an eighteenth aspect, alone or in combination with one or more of the first through seventeenth aspects, the one or more PDSCHs that carry the PTRS pilot signals include multiple PDSCHs, and PTRS patterns for the PTRS pilot signals on different PDSCHs, of the multiple PDSCHs, are independent of one another.

In a nineteenth aspect, alone or in combination with one or more of the first through eighteenth aspects, the one or more PDSCHs that carry the PTRS pilot signals include multiple PDSCHs, and a PTRS pattern for the PTRS pilot signals is the same across the multiple PDSCHs.

In a twentieth aspect, alone or in combination with one or more of the first through nineteenth aspects, the PTRS pattern is a densest pattern of multiple PTRS patterns determined for the multiple PDSCHs.

In a twenty-first aspect, alone or in combination with one or more of the first through twentieth aspects, the PTRS pattern is identified based at least in part on one or more of: an indication from a base station, respective identifiers corresponding to the plurality of PDSCHs, respective bandwidths corresponding to the plurality of PDSCHs, an ordering of the plurality of PDSCHs in DCI, feedback provided by the UE to a base station, or a combination thereof.

In a twenty-second aspect, alone or in combination with one or more of the first through twenty-first aspects, the one or more PDSCHs that carry the PTRS pilot signals includes a single PDSCH included in the plurality of PDSCHs.

In a twenty-third aspect, alone or in combination with one or more of the first through twenty-second aspects, the one or more PDSCHs that carry the PTRS pilot signals are identified based at least in part on an indication from a base station.

In a twenty-fourth aspect, alone or in combination with one or more of the first through twenty-third aspects, the indication is included in an RRC message.

In a twenty-fifth aspect, alone or in combination with one or more of the first through twenty-fourth aspects, the one or more PDSCHs that carry the PTRS pilot signals are identified based at least in part on a plurality of identifiers corresponding to the plurality of PDSCHs, wherein the plurality of identifiers includes at least one of: a plurality of control resource set (CORESET) identifiers corresponding to the plurality of PDSCHs, a plurality of physical cell identifiers corresponding to the plurality of PDSCHs, a plurality of virtual cell identifiers corresponding to the plurality of PDSCHs, a plurality of quasi co-location identifiers corresponding to the plurality of PDSCHs, a plurality of quasi co-location group identifiers corresponding to the plurality of PDSCHs, a plurality of bandwidth part identifiers corresponding to the plurality of PDSCHs, or a combination thereof.

In a twenty-sixth aspect, alone or in combination with one or more of the first through twenty-fifth aspects, the one or more PDSCHs that carry the PTRS pilot signals are identified based at least in part on a determination that an identifier, of the plurality of identifiers, matches a preconfigured identifier or satisfies a condition with respect to all other identifiers of the plurality of identifiers.

In a twenty-seventh aspect, alone or in combination with one or more of the first through twenty-sixth aspects, the one or more PDSCHs that carry the PTRS pilot signals are identified based at least in part on a plurality of bandwidths corresponding to the plurality of PDSCHs when the plurality of PDSCHs are scheduled by the same downlink control information.

In a twenty-eighth aspect, alone or in combination with one or more of the first through twenty-seventh aspects, the one or more PDSCHs have the largest bandwidth as compared to other PDSCHs included in the plurality of PDSCHs.

In a twenty-ninth aspect, alone or in combination with one or more of the first through twenty-eighth aspects, the one or more PDSCHs that carry the PTRS pilot signals are identified based at least in part on an ordering of the plurality of PDSCHs in DCI when the plurality of PDSCHs are scheduled by the same DCI.

In a thirtieth aspect, alone or in combination with one or more of the first through twenty-ninth aspects, the one or more PDSCHs that carry the PTRS pilot signals are identified based at least in part on feedback provided by the UE to a base station.

In a thirty-first aspect, alone or in combination with one or more of the first through thirtieth aspects, the one or more PDSCHs that carry the PTRS pilot signals include a first PDSCH, configured on the same symbols as a second PDSCH, and a third PDSCH configured on disjoint symbols from the first PDSCH and the second PDSCH.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
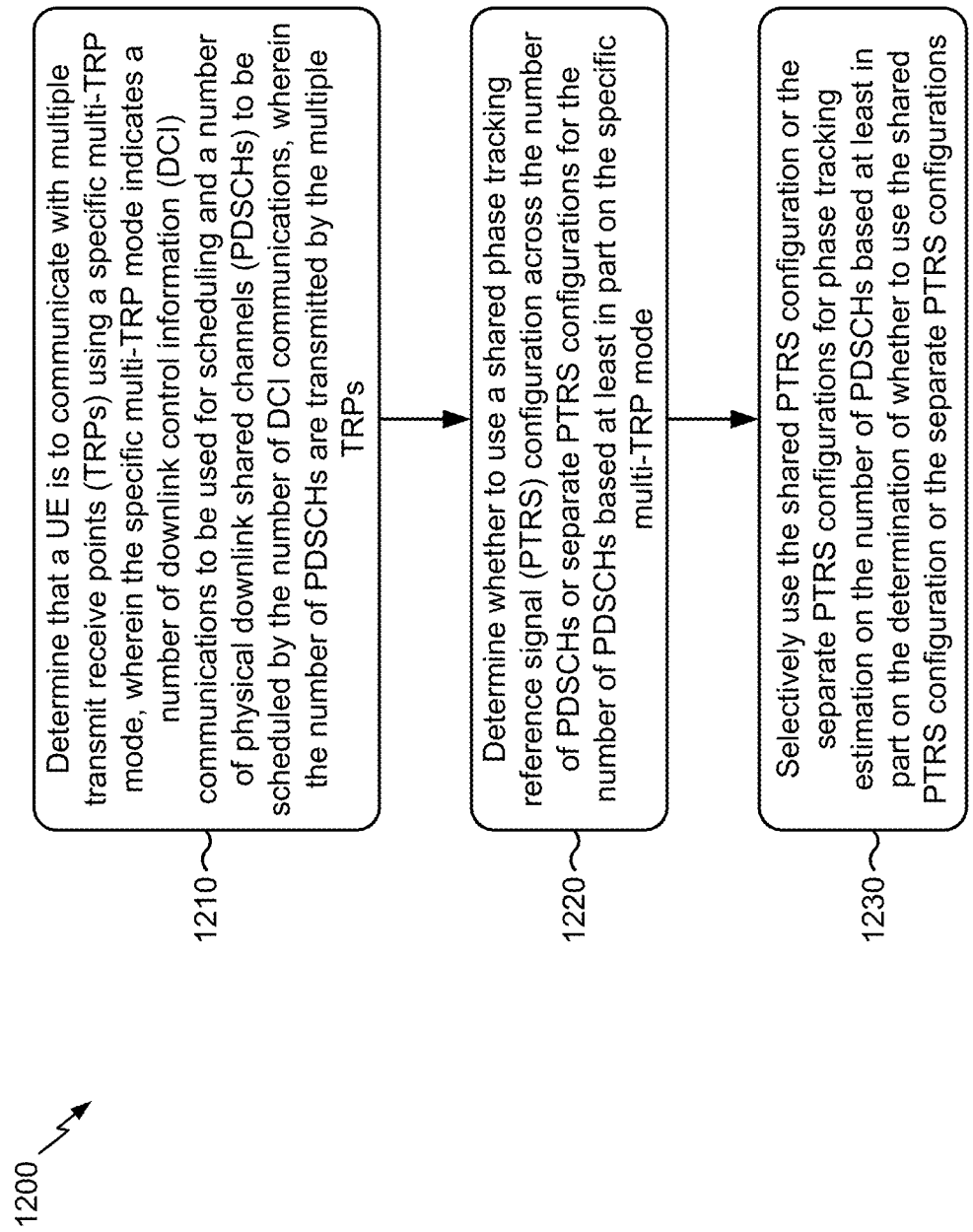

FIG. 12 is a diagram illustrating an example process 1200 performed, for example, by a UE, in accordance with various aspects of the present disclosure. Example process 1200 is an example where a UE (e.g., UE 120 and/or the like) performs operations associated with PTRS port or configuration sharing across multiple physical downlink channels of TRPs.

As shown in FIG. 12, in some aspects, process 1200 may include determining that the UE is to communicate with multiple TRPs using a specific multi-TRP mode, wherein the specific multi-TRP mode indicates a number of DCI communications to be used for scheduling and a number of PDSCHs to be scheduled by the number of DCI communications, wherein the number of PDSCHs are transmitted by the multiple TRPs (block 1210). For example, the UE (e.g., using controller/processor 280 and/or the like) may determine that the UE is to communicate with multiple TRPs using a specific multi-TRP mode, wherein the specific multi-TRP mode indicates a number of DCI communications to be used for scheduling and a number of PDSCHs to be scheduled by the number of DCI communications, as described above in connection with FIG. 10. In some aspects, the number of PDSCHs are transmitted by the multiple TRPs.

As further shown in FIG. 12, in some aspects, process 1200 may include determining whether to use a shared PTRS configuration across the number of PDSCHs or separate PTRS configurations for the number of PDSCHs based at least in part on the specific multi-TRP mode (block 1220). For example, the UE (e.g., using controller/processor 280 and/or the like) may determine whether to use a shared PTRS configuration across the number of PDSCHs or separate PTRS configurations for the number of PDSCHs based at least in part on the specific multi-TRP mode, as described above in connection with FIG. 10.

As further shown in FIG. 12, in some aspects, process 1200 may include selectively using the shared PTRS configuration or the separate PTRS configurations for phase tracking estimation on the number of PDSCHs based at least in part on the determination of whether to use the shared PTRS configuration or the separate PTRS configurations (block 1230). For example, the UE (e.g., using controller/processor 280 and/or the like) may selectively use the shared PTRS configuration or the separate PTRS configurations for phase tracking estimation on the number of PDSCHs based at least in part on the determination of whether to use the shared PTRS configuration or the separate PTRS configurations, as described above in connection with FIG. 10.

Process 1200 may include additional aspects, such as any single aspect or any combination of aspects described below and/or in connection with one or more other processes described elsewhere herein.

In a first aspect, the shared PTRS configuration or each PTRS configuration, of the separate PTRS configurations, indicates a plurality of PTRS patterns and corresponding conditions in which each of the plurality of PTRS patterns are to be applied.

In a second aspect, alone or in combination with the first aspect, the shared PTRS configuration is used when the specific multi-TRP mode is a first multi-TRP mode that indicates that a single DCI communication is to be used to schedule a single PDSCH transmitted by the multiple TRPs.

In a third aspect, alone or in combination with one or more of the first and second aspects, the determination of whether to use the shared PTRS configuration or the separate PTRS configurations is based at least in part on an indication in an RRC message.

In a fourth aspect, alone or in combination with one or more of the first through third aspects, the indication is included in the RRC message when the specific multi-TRP mode is a second multi-TRP mode, that indicates that a single DCI communication is to be used to schedule multiple PDSCHs transmitted by the multiple TRPs, or a third multi-TRP mode that indicates that multiple DCI communications are to be used to schedule multiple PDSCHs transmitted by the multiple TRPs.

In a fifth aspect, alone or in combination with one or more of the first through fourth aspects, the determination of whether to use the shared PTRS configuration or the separate PTRS configurations is based at least in part on a capability of the UE to support the shared PTRS configuration or the separate PTRS configurations.

In a sixth aspect, alone or in combination with one or more of the first through fifth aspects, the specific multi-TRP mode is a second multi-TRP mode that indicates that a single DCI communication is to be used to schedule multiple PDSCHs transmitted by the multiple TRPs, and a size of the single DCI communication depends on whether PTRS ports are shared across the multiple PDSCHs.

In a seventh aspect, alone or in combination with one or more of the first through sixth aspects, the specific multi-TRP mode is a third multi-TRP mode that indicates that multiple DCI communications are to be used to schedule multiple PDSCHs transmitted by the multiple TRPs, and a size of one or more DCI communications, of the multiple DCI communications, depends on whether PTRS ports are shared across the multiple PDSCHs.

In an eighth aspect, alone or in combination with one or more of the first through seventh aspects, the specific multi-TRP mode is a fourth multi-TRP mode that indicates that multiple DCI communications are to be used to schedule a single PDSCH transmitted by the multiple TRPs, and each DCI communication, of the multiple DCI communications, indicates a same PTRS configuration.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   determining that a phase tracking reference signal (PTRS) port is to be shared among a plurality of physical downlink shared channels (PDSCHs) transmitted by a plurality of transmit receive points (TRPs);
   receiving PTRS pilot signals on one or more PDSCHs of the plurality of PDSCHs; and
   using the PTRS pilot signals for phase tracking estimation for the plurality of PDSCHs based at least in part on the determination that the PTRS port is to be shared among the plurality of PDSCHs.

2. The method of claim 1, wherein using the PTRS pilot signals for phase tracking estimation for the plurality of PDSCHs comprises using different PTRS, of the PTRS pilot signals, to estimate a same set of phase tracking parameters for the plurality of PDSCHs.

3. The method of claim 1, wherein the determination that the PTRS port is to be shared among the plurality of PDSCHs is based at least in part on:
   a determination that the plurality of PDSCHs are scheduled by the same downlink control information,
   a determination that the plurality of PDSCHs use the same set of demodulation reference signal (DMRS) ports,
   a determination that the plurality of PDSCHs carry the same transport block,
   an explicit indication from a base station,
   an indication that one or more PTRS ports or one or more demodulation reference signal (DMRS) ports associated with the plurality of PDSCHs are quasi co-located with respect to Doppler shift or belong to a group of ports having the same phase shift, a determination that the plurality of PDSCHs are scheduled to completely overlap in a time domain, a determination that the plurality of PDSCHs belong to the same component carrier or the same bandwidth part of the component carrier, a capability of the UE to support PTRS port sharing among the plurality of PDSCHs, or a combination thereof.

4. The method of claim 1, wherein the determination that the PTRS port is to be shared among the plurality of PDSCHs is based at least in part on a determination that a condition is satisfied for the plurality of PDSCHs and an indication that the PTRS port is to be shared among the plurality of PDSCHs when the condition is satisfied.

5. The method of claim 4, wherein the indication includes an indication in at least one of a radio resource control (RRC) message or downlink control information (DCI).

6. The method of claim 4, wherein the condition includes at least one of:

the plurality of PDSCHs being scheduled by the same downlink control information, the plurality of PDSCHs using the same set of demodulation reference signal (DMRS) ports, the plurality of PDSCHs carrying the same transport block, one or more ports, associated with the plurality of PDSCHs, being quasi co-located with respect to Doppler shift or belonging to a group of ports having the same phase shift, the plurality of PDSCHs being scheduled to completely overlap in a time domain, the plurality of PDSCHs belonging to the same component carrier or bandwidth part, or a combination thereof.

7. The method of claim 1, further comprising identifying the one or more PDSCHs that carry the PTRS pilot signals.

8. The method of claim 1, wherein the one or more PDSCHs that carry the PTRS pilot signals include all PDSCHs in the plurality of PDSCHs.

9. The method of claim 1, wherein the one or more PDSCHs that carry the PTRS pilot signals include multiple PDSCHs, and wherein PTRS patterns for the PTRS pilot signals on different PDSCHs, of the multiple PDSCHs, are independent of one another.

10. The method of claim 1, wherein the one or more PDSCHs that carry the PTRS pilot signals include multiple PDSCHs, and wherein a PTRS pattern for the PTRS pilot signals is the same across the multiple PDSCHs.

11. The method of claim 10, wherein the PTRS pattern is a densest pattern of multiple PTRS patterns determined for the multiple PDSCHs.

12. The method of claim 10, wherein the PTRS pattern is identified based at least in part on one or more of:

an indication from a base station, respective identifiers corresponding to the plurality of PDSCHs, respective bandwidths corresponding to the plurality of PDSCHs, an ordering of the plurality of PDSCHs in downlink control information (DCI), feedback provided by the UE to a base station, or a combination thereof.

13. The method of claim 1, wherein the one or more PDSCHs that carry the PTRS pilot signals includes a single PDSCH included in the plurality of PDSCHs.

14. The method of claim 1, wherein the one or more PDSCHs that carry the PTRS pilot signals are identified based at least in part on at least one of:

an indication from a base station, a plurality of identifiers corresponding to the plurality of PDSCHs, a plurality of bandwidths corresponding to the plurality of PDSCHs when the plurality of PDSCHs are scheduled by the same downlink control information, wherein the one or more PDSCHs have the largest bandwidth as compared to other PDSCHs included in the plurality of PDSCHs, an ordering of the plurality of PDSCHs in downlink control information (DCI) when the plurality of PDSCHs are scheduled by the same DCI, feedback provided by the UE to the base station, or a combination thereof.

15. The method of claim 14, wherein the plurality of identifiers includes at least one of:

a plurality of control resource set (CORESET) identifiers corresponding to the plurality of PDSCHs, a plurality of physical cell identifiers corresponding to the plurality of PDSCHs, a plurality of virtual cell identifiers corresponding to the plurality of PDSCHs, a plurality of quasi co-location identifiers corresponding to the plurality of PDSCHs, a plurality of quasi co-location group identifiers corresponding to the plurality of PDSCHs, a plurality of bandwidth part identifiers corresponding to the plurality of PDSCHs, or a combination thereof.

16. The method of claim 14, wherein the one or more PDSCHs that carry the PTRS pilot signals are identified based at least in part on a determination that an identifier, of the plurality of identifiers, matches a preconfigured identifier or satisfies a condition with respect to all other identifiers of the plurality of identifiers.

17. The method of claim 1, wherein the one or more PDSCHs that carry the PTRS pilot signals include a first PDSCH, configured on the same symbols as a second PDSCH, and a third PDSCH configured on disjoint symbols from the first PDSCH and the second PDSCH.

18. A method of wireless communication performed by a user equipment (UE), comprising:

determining that the UE is to communicate with multiple transmit receive points (TRPs) using a specific multi-TRP mode, wherein the specific multi-TRP mode indicates a number of downlink control information (DCI) communications to be used for scheduling and a number of physical downlink shared channels (PDSCHs) to be scheduled by the number of DCI communications, wherein the number of PDSCHs are transmitted by the multiple TRPs;

determining whether to use a shared phase tracking reference signal (PTRS) configuration across the number of PDSCHs or separate PTRS configurations for the number of PDSCHs based at least in part on the specific multi-TRP mode; and selectively using the shared PTRS configuration or the separate PTRS configurations for phase tracking estimation on the number of PDSCHs based at least in part on the determination of whether to use the shared PTRS configuration or the separate PTRS configurations.

19. The method of claim 18, wherein the shared PTRS configuration or each PTRS configuration, of the separate PTRS configurations, indicates a plurality of PTRS patterns and corresponding conditions in which each of the plurality of PTRS patterns are to be applied.

20. The method of claim 18, wherein the shared PTRS configuration is used when the specific multi-TRP mode is a first multi-TRP mode that indicates that a single DCI communication is to be used to schedule a single PDSCH transmitted by the multiple TRPs.

21. The method of claim 18, wherein the determination of whether to use the shared PTRS configuration or the separate PTRS configurations is based at least in part on an indication in a radio resource control (RRC) message.

22. The method of claim 21, wherein the indication is included in the RRC message when the specific multi-TRP mode is a second multi-TRP mode, that indicates that a single DCI communication is to be used to schedule multiple PDSCHs transmitted by the multiple TRPs, or a third multi-TRP mode that indicates that multiple DCI communications are to be used to schedule multiple PDSCHs transmitted by the multiple TRPs.

23. The method of claim 18, wherein the determination of whether to use the shared PTRS configuration or the separate PTRS configurations is based at least in part on a capability of the UE to support the shared PTRS configuration or the separate PTRS configurations.

24. The method of claim 18, wherein the specific multi-TRP mode is a second multi-TRP mode that indicates that a single DCI communication is to be used to schedule multiple PDSCHs transmitted by the multiple TRPs, and wherein a size of the single DCI communication depends on whether PTRS ports are shared across the multiple PDSCHs.

25. The method of claim 18, wherein the specific multi-TRP mode is a third multi-TRP mode that indicates that multiple DCI communications are to be used to schedule multiple PDSCHs transmitted by the multiple TRPs, and wherein a size of one or more DCI communications, of the multiple DCI communications, depends on whether PTRS ports are shared across the multiple PDSCHs.

26. The method of claim 18, wherein the specific multi-TRP mode is a fourth multi-TRP mode that indicates that multiple DCI communications are to be used to schedule a single PDSCH transmitted by the multiple TRPs, and wherein each DCI communication, of the multiple DCI communications, indicates a same PTRS configuration.

27. A user equipment (UE) for wireless communication, comprising:
    a memory; and
    one or more processors operatively coupled to the memory, the memory and the one or more processors configured to:
        determine that a phase tracking reference signal (PTRS) port is to be shared among a plurality of physical downlink shared channels (PDSCHs) transmitted by a plurality of transmit receive points (TRPs);
        receive PTRS pilot signals on one or more PDSCHs of the plurality of PDSCHs; and
        use the PTRS pilot signals for phase tracking estimation for the plurality of PDSCHs based at least in part on the determination that the PTRS port is to be shared among the plurality of PDSCHs.

28. The UE of claim 27, wherein the determination that the PTRS port is to be shared among the plurality of PDSCHs is based at least in part on:
    a determination that the plurality of PDSCHs are scheduled by the same downlink control information,
    a determination that the plurality of PDSCHs use the same set of demodulation reference signal (DMRS) ports,
    a determination that the plurality of PDSCHs carry the same transport block,
    an explicit indication from a base station,
    an indication that one or more PTRS ports or one or more demodulation reference signal (DMRS) ports associated with the plurality of PDSCHs are quasi co-located with respect to Doppler shift or belong to a group of ports having the same phase shift,
    a determination that the plurality of PDSCHs are scheduled to completely overlap in a time domain,
    a determination that the plurality of PDSCHs belong to the same component carrier or the same bandwidth part of the component carrier,
    a capability of the UE to support PTRS port sharing among the plurality of PDSCHs, or
    a combination thereof.

29. A user equipment (UE) for wireless communication, comprising:
    a memory; and
    one or more processors operatively coupled to the memory, the memory and the one or more processors configured to:
        determine that the UE is to communicate with multiple transmit receive points (TRPs) using a specific multi-TRP mode, wherein the specific multi-TRP mode indicates a number of downlink control information (DCI) communications to be used for scheduling and a number of physical downlink shared channels (PDSCHs) to be scheduled by the number of DCI communications, wherein the number of PDSCHs are transmitted by the multiple TRPs;
        determine whether to use a shared phase tracking reference signal (PTRS) configuration across the number of PDSCHs or separate PTRS configurations for the number of PDSCHs based at least in part on the specific multi-TRP mode; and
        selectively use the shared PTRS configuration or the separate PTRS configurations for phase tracking estimation on the number of PDSCHs based at least in part on the determination of whether to use the shared PTRS configuration or the separate PTRS configurations.

30. The UE of claim 29, wherein the shared PTRS configuration or each PTRS configuration, of the separate PTRS configurations, indicates a plurality of PTRS patterns and corresponding conditions in which each of the plurality of PTRS patterns are to be applied.

* * * * *